United States Patent
Frind et al.

(10) Patent No.: US 9,679,259 B1
(45) Date of Patent: Jun. 13, 2017

(54) SYSTEMS AND METHODS FOR TRAINING AND EMPLOYING A MACHINE LEARNING SYSTEM IN EVALUATING ENTITY PAIRS

(71) Applicant: PLENTYOFFISH MEDIA INC., Vancouver (CA)

(72) Inventors: Markus Frind, Vancouver (CA); Sa Li, Vancouver (CA); Steve Oldridge, Vancouver (CA)

(73) Assignee: PLENTYOFFISH MEDIA ULC, Vancouver (CA)

(*) Notice: Subject to any disclaimer, the term of this patent is extended or adjusted under 35 U.S.C. 154(b) by 330 days.

(21) Appl. No.: 14/163,849

(22) Filed: Jan. 24, 2014

Related U.S. Application Data

(60) Provisional application No. 61/756,912, filed on Jan. 25, 2013.

(51) Int. Cl.
*G06N 99/00* (2010.01)

(52) U.S. Cl.
CPC .................. *G06N 99/005* (2013.01)

(58) Field of Classification Search
None
See application file for complete search history.

(56) References Cited

U.S. PATENT DOCUMENTS

| | | |
|---|---|---|
| 5,583,763 A | 12/1996 | Atcheson et al. |
| 5,749,091 A | 5/1998 | Ishida et al. |
| 5,963,951 A | 10/1999 | Collins |
| 6,006,225 A | 12/1999 | Bowman et al. |
| 6,018,738 A | 1/2000 | Breese et al. |
| 6,038,295 A | 3/2000 | Mattes |
| 6,041,311 A | 3/2000 | Chislenko et al. |
| 6,049,777 A | 4/2000 | Sheena et al. |

(Continued)

OTHER PUBLICATIONS

Alsaleh, "Improving Matching Process in Social Network Using Implicit and Explicit User Information", Computer Science Discipline, Queensland University of Technology Brisbane, Australia, APWeb 2011, LNCS 6612, pp. 313-320, 2011, Springer-Verlag Berlin Heidelberg 2011.*

(Continued)

*Primary Examiner* — Stanley K Hill
*Assistant Examiner* — Ilya Traktovenko
(74) *Attorney, Agent, or Firm* — Seed IP Law Group LLP

(57) ABSTRACT

A matching or pairing system and method for matching first and second entities having a greater likelihood of forming a successful pairing includes a trained machine learning system to provide heuristic values useful in determining a compatibility score for the pairing. During training of the machine learning system, a training example selection device can provide attribute values logically associated with entities engaged in historically successful pairings and a number of hypothetically successful pairings. The hypothetically successful pairings may be based at least in part on historically successful pairings where at least one attribute value logically associated with at least one entity in the pairing is varied, adjusted, or subjected to a loosened constraint. During run-time operation a screening device can screen unsuccessful pairings and forward potentially successful pairings that meet a threshold value to the neural network. The system can then determine a compatibility score for the pairing.

37 Claims, 9 Drawing Sheets

(56) References Cited

U.S. PATENT DOCUMENTS

| | | | |
|---|---|---|---|
| 6,058,367 A * | 5/2000 | Sutcliffe | G06Q 30/0201 434/323 |
| 6,064,980 A | 5/2000 | Jacobi et al. | |
| 6,134,532 A | 10/2000 | Lazarus et al. | |
| 6,169,986 B1 | 1/2001 | Bowman et al. | |
| 6,199,067 B1 | 3/2001 | Geller | |
| 6,266,649 B1 | 7/2001 | Linden et al. | |
| 6,356,879 B2 | 3/2002 | Aggarwal et al. | |
| 6,735,568 B1 | 5/2004 | Buckwalter et al. | |
| 6,772,150 B1 | 8/2004 | Whitman et al. | |
| 6,782,370 B1 | 8/2004 | Stack | |
| 6,783,065 B2 | 8/2004 | Spitz et al. | |
| 6,853,982 B2 | 2/2005 | Smith et al. | |
| 6,912,505 B2 | 6/2005 | Linden et al. | |
| 7,113,917 B2 | 9/2006 | Jacobi et al. | |
| 7,240,353 B2 | 7/2007 | Lau et al. | |
| 7,313,536 B2 | 12/2007 | Westphal | |
| 7,324,998 B2 | 1/2008 | Beres et al. | |
| 8,122,142 B1 | 2/2012 | Svendsen et al. | |
| 8,180,765 B2 | 5/2012 | Nicolov | |
| 8,566,938 B1 | 10/2013 | Prakash et al. | |
| 8,577,874 B2 | 11/2013 | Svendsen et al. | |
| 8,620,790 B2 | 12/2013 | Priebatsch | |
| 8,626,663 B2 | 1/2014 | Nightengale et al. | |
| 8,825,802 B2 | 9/2014 | Pearce | |
| 8,930,398 B1 | 1/2015 | Kishore et al. | |
| 9,047,611 B2 | 6/2015 | Krishnamoorthy et al. | |
| 9,069,945 B2 | 6/2015 | Singh | |
| 9,219,704 B2 | 12/2015 | Hamlin et al. | |
| 2002/0095303 A1 | 7/2002 | Asayama et al. | |
| 2002/0156632 A1 | 10/2002 | Haynes et al. | |
| 2003/0093405 A1 | 5/2003 | Mayer | |
| 2003/0234519 A1 * | 12/2003 | Farmer | B60R 16/0231 280/728.1 |
| 2004/0012638 A1 | 1/2004 | Donnelli et al. | |
| 2005/0027707 A1 | 2/2005 | Syed | |
| 2005/0108227 A1 | 5/2005 | Russell-Falla et al. | |
| 2005/0108344 A1 | 5/2005 | Tafoya et al. | |
| 2005/0240608 A1 | 10/2005 | Jones et al. | |
| 2006/0018522 A1 | 1/2006 | Sunzeri et al. | |
| 2006/0059142 A1 | 3/2006 | Zvinyatskovsky et al. | |
| 2006/0256959 A1 * | 11/2006 | Hymes | H04M 1/26 379/433.04 |
| 2007/0005587 A1 | 1/2007 | Johnson et al. | |
| 2007/0112792 A1 | 5/2007 | Majumder | |
| 2007/0206917 A1 | 9/2007 | Ono et al. | |
| 2007/0265962 A1 | 11/2007 | Bowe, Jr. et al. | |
| 2008/0039121 A1 * | 2/2008 | Muller | H04M 7/0036 455/456.3 |
| 2008/0086534 A1 * | 4/2008 | Bardak | G06Q 30/02 709/206 |
| 2008/0103971 A1 | 5/2008 | Lukose et al. | |
| 2009/0066722 A1 * | 3/2009 | Kriger | G06Q 30/02 345/619 |
| 2009/0094048 A1 * | 4/2009 | Wallace | G06Q 50/01 705/319 |
| 2009/0106043 A1 * | 4/2009 | Buckwalter | G06Q 30/02 705/319 |
| 2009/0144329 A1 | 6/2009 | Marlow | |
| 2009/0164464 A1 | 6/2009 | Carrico et al. | |
| 2009/0216734 A1 | 8/2009 | Aghajanyan et al. | |
| 2009/0248599 A1 * | 10/2009 | Hueter | G06Q 10/00 706/20 |
| 2009/0299645 A1 * | 12/2009 | Colby | C12Q 1/6883 702/19 |
| 2010/0002920 A1 * | 1/2010 | Cosatto | G06K 9/00147 382/128 |
| 2010/0036806 A1 | 2/2010 | Lam et al. | |
| 2010/0114614 A1 | 5/2010 | Sharpe | |
| 2010/0169376 A1 | 7/2010 | Chu | |
| 2010/0262611 A1 | 10/2010 | Frind | |
| 2010/0318544 A1 | 12/2010 | Nicolov | |
| 2011/0107260 A1 * | 5/2011 | Park | G06Q 10/04 715/811 |
| 2011/0131085 A1 | 6/2011 | Wey | |
| 2011/0167059 A1 | 7/2011 | Fallah | |
| 2011/0178881 A1 | 7/2011 | Pulletikurty | |
| 2011/0219310 A1 | 9/2011 | Robson | |
| 2011/0270813 A1 | 11/2011 | Cok et al. | |
| 2011/0306028 A1 | 12/2011 | Galimore | |
| 2012/0059850 A1 * | 3/2012 | Bent | G06F 17/30256 707/776 |
| 2012/0088524 A1 | 4/2012 | Moldavsky et al. | |
| 2012/0102410 A1 | 4/2012 | Gewecke et al. | |
| 2012/0110085 A1 | 5/2012 | Malik et al. | |
| 2012/0123828 A1 | 5/2012 | Pahls et al. | |
| 2012/0166285 A1 | 6/2012 | Shapiro et al. | |
| 2012/0190386 A1 | 7/2012 | Anderson | |
| 2012/0198002 A1 * | 8/2012 | Goulart | H04L 51/36 709/206 |
| 2012/0284341 A1 * | 11/2012 | Masood | G06Q 50/01 709/205 |
| 2013/0138741 A1 | 5/2013 | Redstone et al. | |
| 2013/0262984 A1 | 10/2013 | Mehr et al. | |
| 2013/0282745 A1 | 10/2013 | Mishra et al. | |
| 2014/0052861 A1 | 2/2014 | Frind et al. | |
| 2014/0095598 A1 | 4/2014 | Schornack et al. | |
| 2014/0095603 A1 | 4/2014 | Bhardwaj et al. | |
| 2014/0122628 A1 | 5/2014 | Yao et al. | |
| 2014/0136933 A1 | 5/2014 | Berger et al. | |
| 2014/0156750 A1 | 6/2014 | De Cristofaro et al. | |
| 2014/0207637 A1 | 7/2014 | Groarke | |

OTHER PUBLICATIONS

Frind et al., "Apparatus, Method and Article to Facilitate Matching of Clients in a Networked Environment," U.S. Appl. No. 61/857,617, filed Jul. 23, 2013, 138 pages.

Frind, "System and Method for Adaptive Matching of User Profiles Based on Viewing and Contact Activity for Social Relationship Services," Preliminary Amendment filed May 24, 2011, for U.S. Appl. No. 12/488,512, 22 pages.

Frind, "System and Method for Adaptive Matching of User Profiles Based on Viewing and Contact Activity for Social Relationship Services," Office Action mailed Aug. 16, 2011, for U.S. Appl. No. 12/488,512, 14 pages.

Frind, "System and Method for Adaptive Matching of User Profiles Based on Viewing and Contact Activity for Social Relationship Services," Amendment filed Nov. 16, 2011, for U.S. Appl. No. 12/488,512, 16 pages.

Frind, "System and Method for Adaptive Matching of User Profiles Based on Viewing and Contact Activity for Social Relationship Services," Office Action mailed Mar. 5, 2012, for U.S. Appl. No. 12/488,512, 19 pages.

Frind, "System and Method for Adaptive Matching of User Profiles Based on Viewing and Contact Activity for Social Relationship Services," Amendment filed May 24, 2012, for U.S. Appl. No. 12/488,512, 20 pages.

Kuchka et al., "Apparatus, Method and Article to Identify Discrepancies Between Clients and in Response Prompt Clients in a Networked Environment," U.S. Appl. No. 14/204,939, filed Mar. 11, 2014, 92 pages.

Levi et al., "Apparatus, Method and Article to Effect User Interest-Based Matching in a Network Environment," U.S. Appl. No. 61/976,296, filed Apr. 7, 2014, 111 pages.

Levi et al., "Apparatus, Method and Article to Facilitate Automatic Detection and Removal of Fraudulent User Information in a Network Environment," U.S. Appl. No. 61/911,908, filed Dec. 4, 2013, 88 pages.

MacKinnon, "Apparatus, Method and Article to Facilitate Exchange of Messages in a Network Environment," U.S. Appl. No. 61/918,466, filed Dec. 19, 2013, 83 pages.

Oldridge et al., "Apparatus, Method and Article to Effect Electronic Message Reply Rate Matching in a Network Environment," U.S. Appl. No. 61/914,154, filed Dec. 10, 2013, 50 pages.

Oldridge et al., "Systems and Methods for Training and Employing a Machine Learning System in Providing Service Level Upgrade Offers," U.S. Appl. No. 61/974,129, filed Apr. 2, 2014, 95 pages.

(56) References Cited

OTHER PUBLICATIONS

Tekle et al., "Apparatus, Method and Article to Facilitate Automatic Detection and Removal of Fraudulent Advertising Accounts in a Network Environment," U.S. Appl. No. 61/948,159, filed Mar. 5, 2014, 79 pages.
"Binary search tree," Wikipedia, retrieved on Feb. 24, 2015, from http://en.wikipedia.org/wiki/Binary_search_tree, 11 pages.
"Chargeback," Wikipedia, retrieved on Feb. 24, 2015, from http://en.wikipedia.org/wiki/Chargeback, 4 pages.
"Merchant account," Wikipedia, retrieved on Feb. 24, 2015, from http://en.wikipedia.org/wiki/Merchant.account, 10 pages.
"Understanding Chargebacks: A Guide to Chargebacks for Online Merchants," DalPay, retrieved on Feb. 24, 2015, from https://www.dalpay.com/en/support/chargebacks.html, 6 pages.
Frind et al., "Apparatus, Method and Article to Facilitate Matching of Clients in a Networked Environment," U.S. Appl. No. 14/339,328, filed Jul. 23, 2014, 135 pages.
Frind et al., "Apparatus, Method and Article to Facilitate Matching of Clients in a Networked Environment," Preliminary Amendment filed Jul. 23, 2014, for U.S. Appl. No. 14/339,328, 11 pages.
Frind, "System and Method for Adaptive Matching of User Profiles Based on Viewing and Contact Activity for Social Relationship Services," Office Action mailed May 19, 2014, for U.S. Appl. No. 12/488,512, 20 pages.
Frind, "System and Method for Adaptive Matching of User Profiles Based on Viewing and Contact Activity for Social Relationship Services," Amendment filed Aug. 12, 2014, for U.S. Appl. No. 12/488,512, 11 pages.
Frind, "System and Method for Adaptive Matching of User Profiles Based on Viewing and Contact Activity for Social Relationship Services," Office Action mailed Nov. 18, 2014, for U.S. Appl. No. 12/488,512, 17 pages.
Frind, "System and Method for Adaptive Matching of User Profiles Based on Viewing and Contact Activity for Social Relationship Services," Amendment filed Jan. 6, 2015, for U.S. Appl. No. 12/488,512, 12 pages.
Frind, "System and Method for Adaptive Matching of User Profiles Based on Viewing and Contact Activity for Social Relationship Services," Amendment filed Feb. 13, 2015, for U.S. Appl. No. 12/488,512, 12 pages.
Levi et al., "Apparatus, Method and Article to Effect User Interest-Based Matching in a Network Environment," U.S. Appl. No. 14/668,808, filed Mar. 25, 2015, 111 pages.
Levi et al., "Apparatus, Method and Article to Facilitate Automatic Detection and Removal of Fraudulent User Information in a Network Environment," U.S. Appl. No. 14/561,004, filed Dec. 4, 2014, 89 pages.
MacKinnon, "Apparatus, Method and Article to Facilitate Exchange of Messages in a Network Environment," U.S. Appl. No. 14/575,888, filed Dec. 18, 2014, 83 pages.
Oldridge et al., "Apparatus, Method and Article to Effect Electronic Message Reply Rate Matching in a Network Environment," U.S. Appl. No. 14/563,504, filed Dec. 8, 2014, 55 pages.
Oldridge et al., "Apparatus, Method and Article to Facilitate User Behavioral Based Dertermination of User Values in a Network Environment," U.S. Appl. No. 62/013,849, filed Jun. 18, 2014, 68 pages.
Oldridge et al., "Apparatus, Method and Article to Predict and Prevent Chargebacks in a Network Environment," U.S. Appl. No. 14/679,792, filed Apr. 6, 2015, 69 pages.
Oldridge et al., "Systems and Methods for Training and Employing a Machine Learning System in Providing Service Level Upgrade Offers," U.S. Appl. No. 14/672,749, filed Mar. 30, 2015, 95 pages.
Tekle et al., "Apparatus, Method and Article to Facilitate Automatic Detection and Removal of Fraudulent Advertising Accounts in a Network Environment," U.S. Appl. No. 14/638,225, filed Mar. 4, 2015, 79 pages.
Therneau et al., "An Introduction to Recursive Partitioning Using the RPART Routines," Mayo Clinic, Feb. 24, 2015, 62 pages.
Frind et al., "Apparatus, Method and Article to Facilitate Matching of Clients in a Networked Environment," U.S. Appl. No. 61/691,082, filed Aug. 20, 2012, 131 pages.
Kuchka et al., "Apparatus, Method and Article to Identify Discrepancies Between Clients and in Response Prompt Clients in a Networked Environment," U.S. Appl. No. 61/780,391, filed Mar. 13, 2013, 92 pages.
Oldridge et al., "Apparatus, Method and Article to Facilitate User Behavioral Based Determination of User Values in a Network Environment," U.S. Appl. No. 14/737,121, filed Jun. 11, 2015, 68 pages.
Frind, "System and Method for Adaptive Matching of User Profiles Based on Viewing and Contact Activity for Social Relationship Services," Office Action, mailed Jun. 24, 2015, for U.S. Appl. No. 12/488,512, 19 pages.
Frind et al., "Apparatus, Method and Article to Facilitate Matching of Clients in a Networked Environment," Office Action, mailed Sep. 21, 2015, for U.S. Appl. No. 13/971,483, 25 pages.
Frind, "System and Method for Adaptive Matching of User Profiles Based on Viewing and Contact Activity for Social Relationship Services," Amendment, filed Sep. 24, 2015, for U.S. Appl. No. 12/488,512, 14 pages.
Frind, "System and Method for Adaptive Matching of User Profiles Based on Viewing and Contact Activity for Social Relationship Services," Office Action, mailed Nov. 12, 2015, for U.S. Appl. No. 12/488,512, 21 pages.
Frind et al., "Apparatus, Method and Article to Facilitate Matching of Clients in a Networked Environment," Amendment, filed on Dec. 8, 2015, for U.S. Appl. No. 13/971,483, 33 pages.
Frind, "System and Methods for Adaptive Matching of User Profiles Based on Viewing and Contact Activity for Social Relationship Services," Amendment, filed Mar. 11, 2016, for U.S. Appl. No. 12/488,512, 15 pages.
Kuchka et al., "Apparatus, Method and Article to Identify Discrepancies Between Clients and in Response Prompt Clients in a Networked Environment," Office Action, mailed Apr. 4, 2016, for U.S. Appl. No. 14/204,939, 80 pages.
Frind et al., "Apparatus, Method and Article to Facilitate Matching of Clients in a Networked Environment," Office Action, mailed Apr. 6, 2016, for U.S. Appl. No. 13/971,483, 26 pages.
Kuchka et al., "Apparatus, Method and Article to Identify Discrepancies Between Clients and in Response Prompt Clients in a Networked Environment," Amendment, Filed Aug. 4, 2016, for U.S. Appl. No. 14/204,939, 38 pages.
Kuchka et al., "Apparatus, Method and Article to Identify Discrepancies Between Clients and in Response Prompt Clients in a Networked Environment," Office Action, dated Sep. 8, 2016, for U.S. Appl. No. 14/204,939, 104 pages.
Fiore et al., "Assessing Attractiveness in Online Dating Profiles," *CHI 2008 Proceedings—Friends, Foe, and Family*:797-806, 2008.

\* cited by examiner

SYSTEMS AND METHODS FOR TRAINING AND EMPLOYING A MACHINE LEARNING SYSTEM IN EVALUATING ENTITY PAIRS

BACKGROUND

Technical Field

The present disclosure generally relates to the field of machine learning. More specifically the present disclosure relates to the field of training of machine learning systems useful for evaluating entity pairs, as well as evaluating entity pairs using information generated by a trained machine learning system.

Description of the Related Art

Pairing or match-making finds use and purpose in many areas, from the smallest of interpersonal relationships to the largest of commercial partnerships. With the extraordinary reach of the Internet into virtually every country on the planet and the computational power of modern-day processors, the extension of personal and commercial pairing or match-making into the digital world could be viewed as inevitable.

In contrast to traditional digital models used in configuring device decision making, machine learning systems instead perform decision making based on connections or pathways established between processing elements. Such structure is more closely analogous to the interconnected neurological pathways found in a biological brain. Within a neural network type machine learning system, the organization and weights assigned to particular connections determine the ultimate heuristic value provided at the output layer of the neural network. Machine learning systems have been found to provide effective event predictions when trained using a large database of historical examples that promote the formation of connections within the machine learning system, the organization of the connections, and the weighting of the connections. During run-time operation of the machine learning system the organization and weighting of the connections provide the decision making capabilities within the machine learning system's system (e.g., hidden layer in neural networks). The run-time performance and accuracy of a machine learning system is to a large extent a function of these connections which, in turn, are dependent upon the quality, number, and types of prior examples provided during the training of the machine learning system.

After completing the training process, machine learning systems can derive meaning from complicated or imprecise data and can extract patterns and detect trends that are too complex to be noticed by either humans or other computer techniques. In at least some instances, a trained machine learning system may be considered an "expert" in analyses performed on data that falls within the limits of training received by the machine learning system. As an "expert," a trained machine learning system hastens the analysis and derivation of relationships within a large volume of data having numerous known and unknown dependencies. Such a data volume and the presence of known and unknown dependencies render comparable human analysis time-consuming at best, and near-impossible in many instances. The strength of machine learning systems lies in the analysis of voluminous and complex data with a high degree of accuracy to ascertain the answers to various "what if" type questions.

Computer networks, in particular the Internet, have opened a new arena where a first entity seeking a second entity, goods, or services are able to find such entities, goods or services matching one or more characteristics provided by the first entity. In a greatly simplified example, Joe who needs a hammer may visit an Internet marketplace, enter "hammer" and find that John makes and sells hammers. In another example, Joe may enter his interests, age, location, and other data on a Website to find potential friends or partners who are interested in meeting other people sharing similar interests or having similar life experiences. Such Websites often employ relatively simple matching criteria such as "Joe likes horses" and "Mary likes horses" to conclude that Joe and Mary would be compatible based on their apparent mutual interest in horses. The use of such a match-based selection or pairing process may however overlook instances where entities having one or more dissimilar, disparate, or different interests are found surprisingly compatible. Additionally, such match-based selection or pairing processes may fail to include near matches that may result in the formation of successful pairings or matches.

What is needed therefore are automated entity pairing systems and methods that are capable of matching or otherwise pairing entities having near, but non-matching, attributes or dissimilar attributes that may have been found compatible based on historically successful matches or pairings.

BRIEF SUMMARY

Dating and similar relationship building Websites tend to collect large volumes of self-reported personal information from a first entity. In at least some instances, such Websites may also optionally collect data regarding those characteristics or parameters the first entity may find attractive or desirable in another. In at least some situations, the self-reported personal information, online activities, or relationship characteristics provided by the first entity supply sufficient insight into the attributes desired by the first entity such that the explicit supply of such attributes to the Website is rendered superfluous or unnecessary. In such situations, the personal information, online activity, and relationship characteristics of the first entity may be analyzed and used by the Website to provide a number of "potential candidate" second entities with whom a potential relationship may be formed. Such personal information, online activity, and relationship characteristic data may also used by the Website to present the first entity in a list of "potential candidates" to one or more second entities who have compatible, comparable, or similar personal information, online activity, and relationship characteristics. Such match-based Websites may not include or may overlook "non-matches" (e.g., first and second entities that have dissimilar interests) or even "near-matches" (e.g., first and second entities that have similar, but non-identical, interests). The rigid application of such match-based selection criteria may deliberately or inadvertently overlook that fact that in many successful pairings, particularly those where one or more attractive similar, but not identical, attributes exist may be missed, passed over, or disregarded by the Website subscriber selection engine responsible for providing pairing recommendations.

It has been advantageously found that a machine learning system, for example a neural network, may be trained to generate output data indicative of the likelihood of formation of a successful pairing between a first entity and a potential candidate second entity. In training the machine learning system, attribute values associated with each entity in a number of successful pairings (i.e., "historically successful pairings") are provided to the machine learning system as a set of training examples. In addition to the relatively limited number of historically successful pairings, a number of pairings where some or all of the attribute values for at least one of the entities have been varied, adjusted, or other altered (i.e., "hypothetically successful pairings") may be provided to the machine learning system as an additional set of training examples. In at least some instances, these potentially successful pairings may be scrubbed or otherwise analyzed, for example by comparing one or more attribute values logically associated with one or both entities, to prune those potentially successful pairings that have been previously found unsuccessful (i.e., "historically unsuccessful pairings"). Advantageously, machine learning systems trained using set(s) of hypothetically successful pairings have been found to surprisingly provide a richer pool of potential candidates having attributes that match or are aligned with the attributes logically associated with the first entity.

In at least some implementations, during run-time operation a machine learning system trained using both data associated with historically successful pairings and data associated with hypothetically successful pairings may accurately, consistently, and reliably determine one or more heuristic values based on one or more attribute values logically associated with both the first and the second entities. The heuristic value determined by the machine learning system may be based at least in part on whether and to what degree such attributes have been found in historically successful pairings between other entities. In at least some instances, the heuristic value determined for a potential pairing of a first entity with a second entity may be viewed as indicative of a quantification of a potential degree of emotional "chemistry" between the entities based on historically successful pairings of other entities having attributes similar to those found in the first and the second entities.

In other words, through the use of criteria that are less stringent than strictly match-based criteria and through the use of attribute values and similar data from historically successful pairings, the trained machine learning system provides significant benefits over other systems using more conventional matching techniques. In some systems, a first entity initiates the potential candidate second entity selection process by entering self-reported data usually in a question/answer format. For example, a first entity may be asked to answer a large number of questions related to their self-confidence, family orientation, self-control, degree of social dependency and openness, and easygoingness. In at least some instances, some of the questions may include questions designed to elicit responsive data indicative of second entity attributes that are viewed as particularly desirable or valuable to the first entity. In at least some instances, at least a portion of the questions may include questions designed to elicit responsive data indicative of first entity attributes that may be used by the system to provide matches for other subscribers. Using the collected data, the system presents a number of second entities as potential candidates using the data provided by the first entity. Various indicia may be used to detect a successful pairing where the first and the second entities engage in at least a temporary relationship. In at least some instances, the system can collect and organize first and second entity data for both successful and unsuccessful pairings.

Attribute value and other data from the entities engaged in such successful pairings may be particularly valuable in providing training examples for a machine learning system. Successful pairings may be identified by the system based on receipt of explicit feedback indicating the formation of a successful pairing between a first entity and a second entity. Successful pairings may also be identified by the system based on inferred formation of a successful pairing between a first entity and a second entity, for example if both the first and second entities leave or otherwise lose interest in participating in dating or relationship building website for a defined period of time (e.g., 30 days, 60 days, etc.)

In at least some instances, attribute value data from historically successful pairings may permit the machine learning system to recognize patterns and other relationships between entity attributes that extend beyond simple matching. Such patterns and other relationships may provide the machine learning system with any number of indicators of comparable or varying degrees of strength useful in identifying those pairings between a first entity and a second entity that have an increased probability of forming a successful pairing.

Advantageously, the use of hypothetically successful pairings to train the machine learning system may enable the trained machine learning system to recognize those pairings where comparable though not identical entity attribute values have been found in historically successful pairings. The pruning of hypothetically successful pairings that have been found historically unsuccessful may further increase the accuracy of the machine learning system by focusing connection development, organization, and weighting within the machine learning system on those pairings that have either been historically successful or have been found within the limits of system experience to lead to hypothetically successful pairings.

In operation, the system may include a data store or similar nontransitory storage that holds or otherwise contains data representative of attribute values collected from a large number of entities. In response to the receipt of attribute value data logically associated with a first entity, the system may determine any number of attribute factors for logical association with each prospective pairing of a first entity and a second entity. In at least some instances, the attribute factors for the prospective pairing may be determined in whole or in part using the attribute values logically associated with the first entity and the second entity. Attribute factors may be mathematically or numerically combined to provide a preliminary score based on the attributes logically associated with each of the entities forming the prospective pairing. Such potential candidates may include not only those second entity candidates having attribute data similar to the first entity, but also those second entity candidates having at least some "close" attribute values that differ by varying degrees from (i.e., do not match) the attribute values logically associated with the first entity.

A potential candidate second entity in a prospective pairing having a preliminary score that falls below a defined threshold (corresponding to a reduced likelihood of forming a successful pairing) may be pruned or otherwise classified as providing a poor pairing and may be removed from presentation to the first entity. On the other hand, each of the potential candidate second entities having a preliminary score greater than or equal to the defined threshold may be presented to the run-time machine learning system for the determination of a heuristic value that may be logically associated with the prospective pairing.

In at least some instances, the heuristic value provided by the machine learning system may be indicative of the compatibility or likelihood of forming a successful pairing between the first entity and the respective second entity. In at least some instances, the heuristic value may be mathematically or numerically combined with the one or more attribute factors logically associated with the prospective pairing of the first entity and the second entity. In at least some instances the combination of the heuristic factor and the attribute factors may be performed by the system using one or more rule-based algorithms (e.g., the attribute factors logically associated with the prospective pairing of the first and the second entities may be multiplied by the heuristic value returned by the run-time machine learning system for the prospective pairing).

In at least some instances, the system may for each prospective pairing determine and assign weights to one or more attribute factors used in determining the compatibility score for the prospective pairing. In at least some implementations, using the compatibility score the system may be able to rank, sort or otherwise order the second entities according to those providing the greatest likelihood of forming a successful pairing with the first entity. Such ranking or ordering is particularly useful where a large number of "close" or "matching" second entities may be present and the first entity must decide the order in which the second entities will be evaluated. For example, a first entity on a dating or relationship website may have one or more particularly attractive or desirable attributes which generate a considerable number of prospective pairings by a large number of second entities. Advantageously, a system employing a machine learning system trained in accordance with the disclosure herein is able to both filter or otherwise prune inquiries from those second entities determined to provide an unsuccessful pairing and rank, sort or otherwise organize the remaining second entities for presentation to the first entity in accordance with the probability of forming a successful pairing with the first entity.

A training system to train at least a first machine learning system of an intentionally loose candidate selection system may be summarized as including at least one non-transitory processor-readable medium that stores processor-executable instructions; and at least one processor communicably coupled to the at least one non-transitory processor-readable medium and which executes the processor-executable instructions and in response: identifies from a plurality of entities a pair of the entities that are a successful pairing; for at least one of the entities of the pair of entities that are identified as a successful pairing, generates a plurality of alternative pairings between the respective entity of the pair of entities identified as the successful pairing and other ones of the entities based at least in part on respective values of at least one of a plurality of attributes associated with respective ones of the entities, and at least one loosened constraint of a number of constraints placed on matching of attribute values; provides the first machine learning system of the intentionally loose matching system with the successful pairing as one training example; and provides the first machine learning system of the intentionally loose matching system with the alternative pairings as additional training examples.

At least a first one of the attributes may have a respective first range of values including at least three possible values. The at least one loosened constraint may cause the at least one processor to find approximate matches between the values of the attributes for one of the entities of the pair of entities and the values of the attributes for at least one other entity for each of the attributes. The at least one loosened constraint may cause the at least one processor to find exact matches between the values of less than all of the attributes for one of the entities of the pair of entities and the values of less than all of the attributes for at least one other entity. The at least one loosened constraint may cause the at least one processor to find inexact matches between the values of less than all of the attributes for one of the entities of the pair of entities and the values of less than all of the attributes for at least one other entity. At least a first one of the attributes may have a respective range of values including at least three sequentially ordered possible values. For at least one of the attributes, the at least one processor may determine in which one of at least two discrete sub-ranges the value of the attribute resides, may assign a respective sub-range value, and may employ the respective sub-range value to computationally identify the alternative pairings based at least in part on respective values of the plurality of attributes. The at least one processor may further, for at least one of the entities, receive a plurality of inputs; and deduce the respective value for at least one of the attributes based at least in part on the received plurality of inputs. The at least one processor may further, prune at least one outlier instance of the alternative pairings before providing the first machine learning system of the intentionally loose candidate selection system with the alternative pairings as additional training examples.

A method of training at least a first machine learning system of an intentionally loose candidate selection system may be summarized as including identifying by at least one processor a pair of the entities, out of a plurality of entities, that are a successful pairing; for at least one of the entities of the pair of entities that are identified as a successful pairing, generating by at least one processor a plurality of alternative pairings between the respective entity of the pair of entities identified as a successful pairing and other ones of the entities by loosening at least one of a number of constraints on finding matches between respective values of at least one attribute of a plurality of attributes, the values of the attributes logically associated with respective ones of the entities; providing the first machine learning system of the intentionally loose candidate selection system with the successful match as one training example; and providing the first machine learning system of the intentionally loose candidate selection system with the alternative pairings as additional training examples.

At least a first one of the attributes may have a respective first range of values including at least three possible values. Generating the plurality of alternative pairings between the respective entity of the pair of entities identified as the successful pairing and other ones of the entities may include finding approximate matches between the values of the attributes for one of the entities of the pair of entities identified as the successful pairing and the values of the respective attributes for at least one other entity for each of the attributes. Generating the plurality of alternative pairings between the respective entity of the pair of entities identified as the successful pairing and other ones of the entities may include finding exact matches between the values of less than all of the attributes for one of the entities of the pair of entities identified as the successful pairing and the values of less than all of the respective attributes for at least one other entity for each of the attributes. Generating the plurality of alternative pairings between the respective entity of the pair of entities identified as the successful pairing and other ones of the entities may include finding inexact matches between the values of less than all of the attributes for one of the entities of the pair of entities identified as the successful pairing and the values of less than all of the respective attributes for at least one other entity for each of the attributes. At least a first one of the attributes may have a respective range of values including at least three sequentially ordered possible values.

The method of training at least a first machine learning system of an intentionally loose candidate selection system may further include, for at least one of the attributes, identifying a respective sub-range value for the value of the attribute, and employing the sub-range value in computationally identifying the plurality of alternative pairings based at least in part on respective values of the plurality of attributes.

The method of training at least a first machine learning system of an intentionally loose candidate selection system may further include, for at least one of the entities, receiving an input that specifies the value for at least one of the attributes of the respective entity.

The method of training at least a first machine learning system of an intentionally loose candidate selection system may further include, for at least one of the entities, receiving a plurality of inputs; and deducing the value for at least one of the attributes based at least in part on the received plurality of inputs.

The method of training at least a first machine learning system of an intentionally loose candidate selection system may further include pruning at least one outlier alternative pairing before providing the first machine learning system of the intentionally loose candidate selection system with the alternative pairings as additional training examples.

An intentionally loose candidate selection system for finding matches between entities may be summarized as including at least one machine learning system including an input layer, an output layer and a hidden layer, the at least one machine learning system trained with at least a first pair of entities that are a successful pairing, and trained with a plurality of alternative pairings between at least one of the entities of the first pair of entities of the successful pairing and other entities of a first set of entities, the alternative pairings based on at least one value of at least one of a plurality of attributes associated with respective ones of the entities and at least one loosened constraint of a number of constraints on the matching of the values of at least one of the attributes; and at least one processor-based system, the at least one processor-based system communicatively coupled to the machine learning system to receive a number of heuristic values indicative of a strength of a pairing between at least one pair of two entities of the first set and that executes a candidate selection algorithm which employs the received heuristic values and respective values for each of at least one attribute for each of a second set of entities to identify prospective candidates.

At least one processor-based system may determine a product of a plurality of respective scores for each of at least two of the attributes. At least a first one of the attributes may have a respective first range of values including at least three sequentially ordered possible values, and for at least the first one of the attributes, the at least one processor may determine in which one of at least two discrete sub-ranges the value of the attribute resides, each of the sub-ranges logically associated with a respective score. At least one processor-based system may weight the scores for at least some of the attributes relative to other of the attributes. The received heuristic values may be normalized values. The attributes may include at least one of: an entity's specified intent, an entity's specified age, an entity's specified height, an entity's specified income, an entity's specified educational attainment level, or an entity's specified body type, represented by a respective data object logically associated with a respective one of the entities. The alternative pairings may result from an inexact match between respective values of all of the attributes for the respective entities. The alternative pairings may result from an exact match between respective values for less than all of the attributes for the respective entities. The alternative pairings may result from an inexact match between respective values of less than all of the attributes for the respective entities for a defined number of attributes. At least some of the prospective candidates may be presented to a user in a ranked order. A plurality of messages sent to a first one of the entities by other ones of the entities may be presented to the first one of the entities in a ranked order, the ranked order reflecting a strength of a pairing between the first one of the entities and the other ones of the entities.

The intentionally loose candidate selection system for finding matches between entities may further include at least a first processor-based server system, communicatively coupled to receive information about the entities, to receive requests for prospective candidates, to provide prospective candidate information to at least some of the entities, and to present a plurality of messages sent to a first entity by other ones of the entities in a ranked order, the ranked order reflecting a strength of a pairing between at least the first entity and the other ones of the entities.

The intentionally loose candidate selection system for finding matches between entities may further include at least a first processor-based server system, communicatively coupled to receive information about the entities, to receive requests for potential candidates, and to provide prospective candidate identifying information to at least some of the entities. The second set of entities may be different from the first set of entities.

A method of using an intentionally loose candidate selection system that includes at least a first trained machine learning system may be summarized as including receiving, by at least one processor-based system, a number of heuristic values each indicative of a strength of a respective pairing between two entities, the heuristic values generated by at least one machine learning system trained with at least a first pair of entities that are a successful pairing, and trained with a plurality of alternative pairings between at least one of the entities of the first pair of entities of the successful pairing and other entities of a first set of entities based at least in part on at least one value of each of at least one of a plurality of attributes associated with respective ones of the entities and based on at least one loosened constraint of a number of constraints applied to matches between the values of at least one of the attributes; and executing, by the at least one processor-based system, a candidate selection algorithm which employs the received heuristic values and respective values for each of at least one attribute for each of a second set of entities to identify prospective candidates.

Executing a candidate selection algorithm may include determining a product of a plurality of respective scores for each of at least two of the attributes and the heuristic values. At least a first one of the attributes may have a respective first range of values including at least three sequentially ordered possible values, and may further include, for at least the first one of the attributes, determining in which one of at least two discrete sub-ranges the value of the attribute resides, by the at least one processor-based system, each of the sub-ranges logically associated with a respective score. Executing a candidate selection algorithm may include weighting the scores for at least some of the attributes relative to other of the attributes, by the at least one processor-based system.

The method of using an intentionally loose candidate selection system that includes at least a first trained machine learning system may further include retrieving the respective values of the attributes from a data object, wherein the attributes may include at least one of: an entity's specified intent, an entity's specified age, an entity's specified height, an entity's specified income, an entity's specified educational attainment level, or an entity's specified body type.

Receiving the heuristic values may include receiving normalized heuristic values. The alternative pairings may be indicative of an inexact match between respective values of the entity of the pair of entities of the successful pairing and the entities of the first set of entities for all of the attributes. The alternative pairings may be indicative of an exact match between respective values of the entity of the pair of entities of the successful pairing and the entities of the first set of entities for less than all of the attributes. The alternative pairings may be indicative of an inexact match between respective values of the entity of the pair of entities of the successful pairing and the entities of the first set of entities for a defined number of attributes less than all of the attributes.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. Operational level details of machine learning system, for example neural networks, and the organization and development of connections therein are known to those of skill in the art and are neither described nor shown in detail herein. Construction, specification and operational level details of standard electronic components such as processors, nontransitory memory, input/output interfaces, and wired and wireless networking are also known to those of skill in the art and are neither described nor shown in detail herein.

Unless the context requires otherwise, throughout the specification and claims which follow, the word "comprise" and variations thereof, such as "comprises" and "comprising," are to be construed in an open, inclusive sense that is as "including, but not limited to."

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise. Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings and Abstract of the Disclosure provided herein are for convenience only and do not interpret the scope or meaning of the embodiments.

For simplicity and ease of discussion, machine learning systems used to provide matches or pairings between individuals seeking some type of personal relationship are provided herein. Those of ordinary skill in the art will readily appreciate the applicability of the systems and methods disclosed herein to a wide variety of personal, commercial, and industrial settings where a mutual pairing of two entities is both advantageous and desirable. Examples of such include, without limitation, purchaser and seller, supplier and consumer, advertiser and consumer, assembler and parts supplier, or the like.

Figure 1:
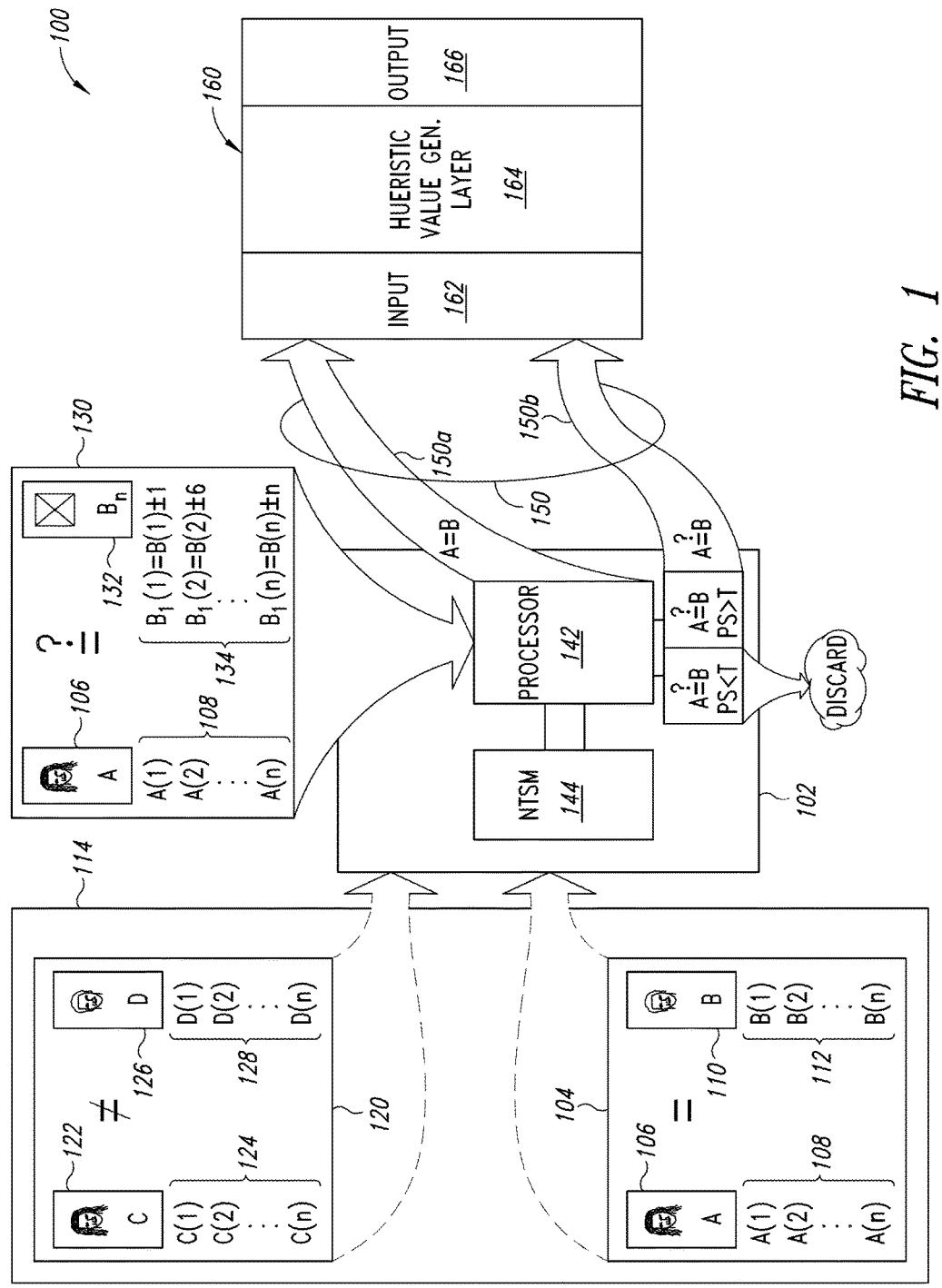
FIG. 1 is a schematic diagram illustrating an example system useful in training a machine learning system, for example a neural network, using as training examples at least a set of historically successful pairings and a set of hypothetically successful pairings, according to one non-limiting illustrated embodiment.

FIG. 1 shows an example system 100 that includes a training example selection device 102 to select and provide a machine learning system 160 with a set of training examples that includes any number of historically successful pairings 104 and any number of hypothetically successful pairings 130, according to one illustrated embodiment. Historically successful pairings 104 may be identified by the training example selection device 102 based on receipt of explicit feedback indicating the formation of a successful pairing between a first entity and a second entity. Historically successful pairings 104 may also be identified by the training example selection device 102 based on inferred formation of a successful pairing between a first entity and a second entity, for example if both the first and second entities leave or otherwise lose interest in participating in dating or relationship building website for a defined period of time (e.g., 30 days, 60 days, etc.)

All or a portion of the historically successful pairings 104 used as training examples for the machine learning system 160 may be stored in whole or in part in a data store 114 within a nontransitory storage remote from the training example selection device 102. In at least some implementations, all or a portion of the historically successful pairings 104 used as training examples for the machine learning system 160 may be stored in whole or in part in a nontransitory storage medium 144 that is collocated with the at least one processor 142 in the training example selection device 102. Each of the successful pairings 104 can include a first entity 106 having any number of attribute values 108 associated therewith and a second entity 110 having any number of attribute values 112 logically associated therewith. In at least some implementations, the attribute values 108 and the attribute values 112 may be based in whole or in part on a common set of criteria.

The run-time performance of the machine learning system 160 is dependent upon the number and quality of training examples provided during the training period. Since relatively fewer successful pairings 104 occur than unsuccessful pairings 120 (i.e., only one potential candidate second entity out of a set of 150 such candidates can form a successful pairing with a first entity), the number of available historically successful pairings 104 is limited. This limited number of available historically successful pairings 104 constrains the number of available historically successful training examples 150a that can be provided to the machine learning system 160 by the training example selection device 102.

To improve the run-time performance of the machine learning system 160 and to provide for the evaluation of a more diverse candidate pool of second entities during run time operation, a number of hypothetically successful pairings 130 may be generated by the at least one processor 142. Some or all of these hypothetically successful pairings 130 may be included in an additional set of training examples 150b supplied by the training example selection device 102 to the machine learning system 160. These hypothetically successful pairings 130 may be advantageously used to train the machine learning system 160 such that during run-time operation, the machine learning system 160 is able to accurately predict whether a successful pairing is likely between a new pair of first and second entities where the second entity may have one or more logically associated attribute values that are close, but not exact matches for the attribute values logically associated with the first entity.

Each of the hypothetically successful pairings 130 included in the set of training examples 150b may be generated in whole or in part by the at least one processor 142. In at least some implementations, the at least one processor 142 may create a hypothetical second entity 132 by varying, adjusting, or loosening one or more constraints on one or more attribute values 112 logically associated with the second entity 110 in a historically successful pairing 104. The attribute values 134 logically associated with the hypothetical second entity 132 are therefore machine-based constructs generated by the at least one processor 142. A hypothetical second entity 132 may be paired by the processor 142 with the actual first entity 106 in the original historically successful pairing to form the hypothetically successful pairing 130. The historically successful pairing training examples 150a and the hypothetically successful training examples 150b may be collectively referred to as "training examples 150."

The training example selection device 102 can include one or more processors 142 and one or more nontransitory storage media 144. In at least some implementations, a data store 114 in which data logically associated with a number of historically successful pairings 104 and historically unsuccessful pairings 120 is stored or otherwise retained may be located in whole or in part in the nontransitory storage media 144. In other implementations, the data store 114 may be located in whole or in part in an external nontransitory storage device that is communicably coupled to the training example selection device 102 via one or more local area networks, wide area networks, or worldwide networks such as the Internet.

The at least one processor 102 can include any single or multi-cored controller or processor, including an application specific integrated circuit (ASIC); a reduced instruction set computer (RISC); a digital signal processor (DSP); a programmable logic controller (PLC); a microprocessor; or a microcontroller.

The nontransitory storage media 144 can store or otherwise retain in whole or in part machine executable instructions that cause the one or more processors 142 to retrieve from the data store 114 data logically associated with a number of historically successful pairings 104 and a number of historically unsuccessful pairings 120. In at least some instances, the nontransitory storage media 144 can also store machine executable instructions that cause the at least one processor 142 to generate the hypothetically successful pairings 130 for inclusion in the set of training examples 150b. In at least some implementations, the nontransitory storage media 144 may store or otherwise retain machine executable instructions that cause the one or more processors 142 to execute one or more rule-based algorithms used to generate some or all of the hypothetically successful pairings 130. In at least some implementations, the nontransitory storage media 144 may store or otherwise retain machine executable instructions that cause the one or more processors 142 to execute one or more rule-based algorithms useful to determine or otherwise quantify the prospective likelihood of a successful pairing between a first entity and second entity.

The training example selection device 102 may supply any number of historically successful pairings 104 as training examples 150*a* to the machine learning system 160. To increase the data pool used in training the machine learning system 160, the training example selection device 102 may additional supply any number of hypothetically successful pairings 130 as training examples 150*b* to the machine learning system 160. In at least some instances, the training example selection device 102 may be communicably coupled to the machine learning system 160 via one or more local area networks, wide area networks, or worldwide networks such as the Internet.

All of the training examples 150 provided by the selection device 102 to the machine learning system 160 are received by an input layer 162 of the machine learning system 160. Within a hueristic value generation layer 164 in the machine learning system, the training examples 150 may be used to form, define, delineate, construct, organize and weight connections within the machine learning system 160. During run-time operation, the machine learning system 160 uses the connections to generate data indicative of or consisting of one or more heuristic values at the output layer 166. Such heuristic values may be used provide insight into the compatibility or the likelihood of formation of a successful pairing between first and second entities providing the attribute value data at the input layer 162 of the machine learning system 160.

Any number of training examples 150 may be supplied by the training example selection device 102 to the machine learning system 160. Such training examples 150 cause the formation, definition, delineation, construction, organization and weighting of connections within the machine learning system 160. Supply of a large number of training examples 150 may advantageously reinforce or weaken connections or adjust connection weights within the machine learning system 160. The supply of a large number of training examples 150 thus tends to improve the reliability and consistency of the heuristic value data provided by the machine learning system 160.

In some implementations one or more historically unsuccessful pairings 120 may optionally be provided as a negative training examples during the training phase of the machine learning system 160. In such instances, each of the historically unsuccessful pairings 120 selected by the training example selection device 102 and provided as a negative training example to the machine learning system 160 includes at least a first entity 122 having a number of attribute values 124 logically associated therewith and a second entity 126 having a corresponding number of common attribute values 128 logically associated therewith.

In the context of a service such as an Internet Website providing person-to-person relationship referrals (e.g., a dating Website), a potential match between a first entity and a second entity is often indicated by comparing the personal attribute data logically associated with the first entity and the second entity to determine whether complimentary attributes exist between the entities. Each of the first entity and the second entities may optionally provide self-reported attribute values that are deemed as "desirable" or "necessary" for the respective entity to form a successful pairing with another entity. Responsive to a request from a first entity, the system can sort through the thousands, tens of thousands or hundreds of thousands of second entity subscriber attribute values to find any number of potential candidate second entities that may lead to a successful pairing with the first entity. Classes or types of attribute value data that may be logically associated with the first entity and each of the selected second entities may include, without limitation, values indicative of the entity's characteristics such as:

Degree of commitment
Age
Height
Income
Education
Body type
Marital status
Children
Employment
Religion
Tobacco use
Interest/lack of interest in another's children
Interest/lack of interest in another's tobacco use
Interest/lack of interest in another's ethnicity
Interest/lack of interest in having children in the future Attribute values that are logically associated with entities engaged in historically successful pairings 104 and historically unsuccessful pairings 120 may be stored or otherwise retained. In at least some instances such entity information and logically associated attribute value data may be stored or otherwise retained in whole or in part in the data store 114. Such successful pairing data, when viewed in conjunction with some or all of the attribute value data logically associated with each entity forming the respective pairing provides a vast and valuable source of data that may be particularly beneficial in training a machine learning system 160 used for evaluating prospective pairings between entities and providing output indicative of the likelihood of forming a successful pairing between the entities.

Figure 2:
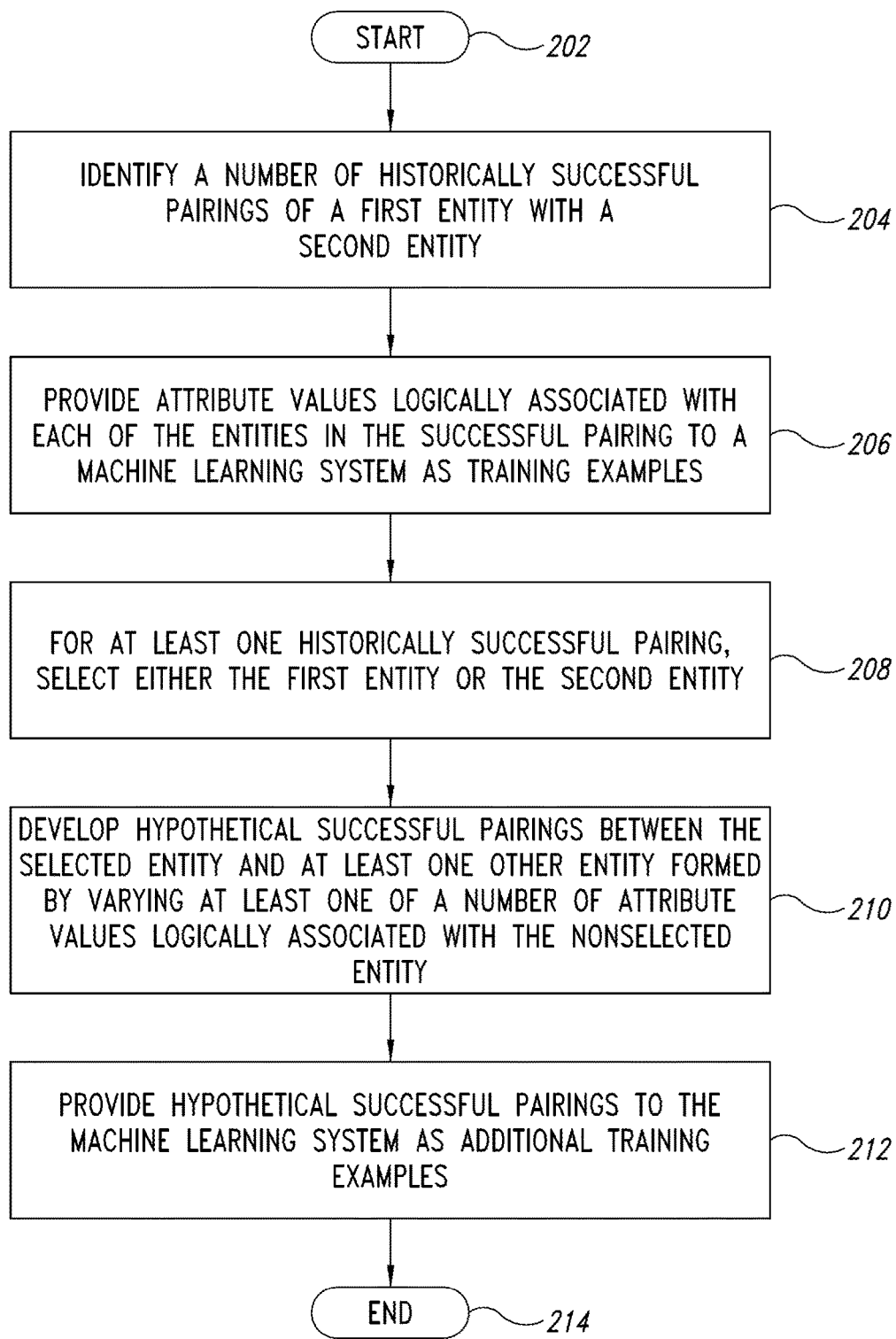
FIG. 2 is a high level flow diagram of an illustrative machine learning system training method that uses as training examples at least one set of historically successful pairings and at least one set of hypothetically successful pairings based on historically successful pairings having one or more varied attribute values, according to one non-limiting illustrated embodiment.

FIG. 2 shows a method 200 that provides training for an illustrative machine learning system 160, according to one illustrated embodiment. In the method 200, a training example selection device 102 selectively provides to the machine learning system 160 training examples that include attribute value data 108, 112 that is logically associated with each entity 106, 110 in a number of historically successful pairings 104 and attribute value data 108, 134 logically associated with each entity 106, 132 in a number of hypothetically successful pairings 130. Using such data, connections are formed, organized, and weighted within the hueristic value generation layer 164 of the machine learning system 160. Because of the large variety of training examples, such connections are reflective of not only actual successful pairings, but also of hypothetically successful pairings similar to historically successful pairings in which one or more attribute values have been varied, adjusted or in which one or more constraints have been loosened. The example machine learning system training method 200 commences at 202.

At 204, the training example selection device 102 identifies a number of historically successful pairings 104 of a first entity 106 with a second entity 110 to serve as training examples 150*a* for the machine learning system 160. In addition, the training example selection device 102 can retrieve data representative of the attribute values 108 logically associated with the first entity 106 and data representative of the attribute values 112 logically associated with the second entity 110. In at least some implementations, at least a portion of the attribute value data supplied to the input layer 162 of the machine learning system 162 may be retrieved from the data store 114 or the nontransitory storage medium 144. The training example selection device 102 may employ one or more selection criteria to identify a number of historically successful pairings 104 to serve as training examples for the machine learning system 160. In at least some instances, the training example selection device 102 may explicitly identify one or more historically successful pairings 104. Explicit indicators of a historically successful pairing 104 may include the receipt of affirmative data from at least one of the first entity 106 or the second entity 110 indicative of the formation of the successful pairing. In other instances, the training example selection device 102 may implicitly identify one or more historically successful pairings 104, for example based on both the first and the second entities leaving the Website for a defined time interval. In at least some instances, implicit indicators of a successful pairing may additionally include the failure of the first entity 106 and the second entity 110 to seek additional pairings.

At 206, for each historically successful pairing 104 selected as a training example 150, the training example selection device 102 provides the input layer 162 of the machine learning system 160 with data representative of the attribute values 108 logically associated with the first entity 106 and data representative of the attributes values 112 logically associated with the second entity 110

In at least some implementations, the training example selection device 102 can use one or more of the identified historically successful pairings 104 as a basis for generating one or more hypothetically successful pairings 130. Such hypothetically successful pairings 130 can be generated by the training example selection device 102 by varying, adjusting or otherwise loosening the constraints on one or more attribute values 112 that are logically associated with the second entity 110 in the historically successful pairing 104.

For example, in some implementations the training example selection device 102 may vary, adjust, or loosen the constraints on the age attribute value provided by the second entity 110 in a historically successful pairing 104. In such an instance, the constraint imposed on the age attribute value may be loosened, increased or decreased by a defined amount (e.g., +/−6 years). Such loosening of the age attribute value will result in the formation of hypothetically successful pairings 130 between the first entity 106 and a number of second entities 132 having an age attribute of ranging from six years below to six years above the age attribute value logically associated with the actual second entity 110. In some implementations, one or more constraints on the degree of commitment attribute value (e.g., using a scale of 0=casual to 5=marriage) provided by the nonselected entity may be loosened, increased, or decreased by a defined amount (e.g., +/−3 scalar units) to provide additional numbers of potential hypothetical second entity 132 pairing candidates. In some implementations, one or more constraints on the height attribute value provided by the nonselected entity in a historically successful pairing 104 may be loosened, increased, or decreased by a defined amount (e.g., +/−3 centimeters) to provide additional numbers of potential hypothetical second entity 132 pairing candidates. In some implementations, one or more constraints on the preferred income level attribute value (e.g., using a scale of "0" represents <$20K to "7" represents >$150K) provided by the nonselected entity in a historically successful pairing 104 may be loosened, increased, or decreased by a defined amount (e.g., +/−1 scalar unit) to provide additional numbers of potential hypothetical second entity 132 pairing candidates. In some implementations, the preferred education attribute value (e.g., using a scale of "0" represents some high school to "7" represents a doctorate degree) provided by a nonselected entity in a historically successful pairing 104 may be loosened, increased, or decreased by a defined amount (e.g., +/−1 scalar unit) to provide additional numbers of potential hypothetical second entity 132 pairing candidates. In some implementations, the preferred body type attribute value (e.g., using a scale of "0" represents skinny/short to "5" represents big/tall) provided by a nonselected entity in a historically successful pairing 104 may be loosened, increased, or decreased by a defined amount (e.g., +/−1 scalar unit) to provide additional numbers of potential hypothetical second entity 132 pairing candidates.

At 208, the training example selection device 102 selects either the first entity 106 or the second entity 110 in at least one historically successful pairing 104. For simplicity, clarity, and ease of discussion, subsequent discussion will assume that the first entity 106 corresponds to the "selected entity" and the second entity 110 corresponds to the "nonselected entity." Those of ordinary skill in the art will readily appreciate that either the first entity 106 or the second entity 110 may be considered the "selected entity."

At 210, the training example selection device 102 generates any number of hypothetical successful pairings 130 between the first entity 106 (i.e., the "selected entity") and a number of hypothetical second entities 132 (i.e., the "nonselected entities") formed by varying, adjusting or loosening the constraints on one or more attribute values 134 logically associated with the hypothetical second entity 132. For example, the selection device 102 may form a number of hypothetical successful pairings 130 between the first entity 106 and hypothetical second entities 132 having ages ranging from the first entity's preferred age (e.g., 28 years old) minus six years to the preferred age plus six years (e.g., 22 years old to 34 years old). In at least some instances, more than one attribute value 134 logically associated with the hypothetical second entity 132 may be varied, adjusted or have loosened constraints to provide additional hypothetical successful pairings 130 useful as training examples 150b for the machine learning system 160.

At 212, the training example selection device 102 communicates each hypothetically successful pairing 130 as a training example 150b to the input layer 162 of the machine learning system 160. In at least some implementations, each of the hypothetically successful training examples 150b so provided may include data indicating the relationship was successful, data indicative of the attribute values 124 logically associated with the first entity 122, and data indicative of the hypothetical attribute values 134 logically associated with the hypothetical second entity 132. The method 200 concludes at 214.

In at least some instances, the hypothetically successful pairings 130 generated by the training example selection device 102 may include pairings or combinations of entities having attribute values that have been historically determined to lead to an unsuccessful pairing (e.g., attribute values logically associated with first and second entities that engaged in a historically unsuccessful pairing 120). If such hypothetical, historically unsuccessful pairings are provided as "successful" training examples 150 to the machine learning system 160, the output provided by the machine learning system 160 during run-time operation may prove less reliable than if such historically unsuccessful hypothetical pairings are "pruned," removed, or not presented as training examples 150 to the machine learning system 160. In at least some instances, one or more rule-based algorithms may be applied to the attribute values 108 logically associated with the first entity 106 and the attribute values 134 associated with the hypothetical second entity 132. Such rule-based algorithms may be used to provide a preliminary score useful in determining whether the proposed pairing of the first entity 106 with a hypothetical second entity 132 indicates the prospective pairing of the first entity 106 with the hypothetical second entity 132 has a greater likelihood of leading to a pairing that is demonstrably historically unsuccessful.

In at least some instances, such rule-based evaluation methods may employ attribute factors that are determined by the training example selection device 102 using the attribute values 108 logically associated with the first entity 106 and the attribute values 134 logically associated with the hypothetical second entity 132. In at least some instances, two or more such attribute factors may be combined, for example via one or more rule-based mathematical or numerical operations such as multiplication, to provide the preliminary score. Such attribute factors may be determined, for example using criteria such as: the age difference between the first and second entities; the educational difference between the first and second entities; and the height difference between the first and second entities.

In at least some implementations, the attribute values logically associated with both the first and the second entities may be mathematically or numerically combined and quantized, unitized, or grouped into any number of subranges. In at least some implementations, each of the factors logically associated with an attribute subrange may additionally be assigned a corresponding numeric value. For example, in at least some implementations, the age attribute factors ($\Delta K_{AGE}$) may be quantized or grouped into one of four subranges based on the difference in age attribute values logically associated with the first entity 106 and the actual or hypothetical second entity:

TABLE 1

AGE ATTRIBUTE FACTORS

| Subrange | Criteria | Value ($\Delta K_{AGE}$) |
|---|---|---|
| A | +/− three (3) years age difference | 4 |
| B | +/− six (6) years age difference | 3 |
| C | +/− nine (9) years age difference | 2 |
| D | all other age differences | 1 |

Other attribute values logically associated with the first entity 106 and the hypothetical second entity 132 may be similarly manipulated and combined to provide additional attribute factors, for example an educational attribute factor ($\Delta K_{EDU}$) and a height attribute factor ($\Delta K_{HGT}$). In at least some instances, these additional attribute factors may be mathematically or numerically combined and quantized, unitized, or grouped into any number of subranges. In at least some implementations, each of the factors logically associated with an attribute subrange may additionally be assigned a corresponding numeric value.

The training example selection device 102 may autonomously execute one or more rule-based algorithms to determine a preliminary score ($\Delta K$) indicative of whether the pairing of a first entity 106 and a hypothetical second entity 132 yields a potentially unsuccessful pairing. In at least one implementation, such a rule-based algorithm may include determining the multiplicative product of the age attribute factor ($\Delta K_{AGE}$), the educational attribute factor ($\Delta K_{EDU}$), and the height attribute factor ($\Delta K_{HGT}$) as shown in Equation 1 below:

$$\Delta K = (\Delta K_{AGE})(\Delta K_{HGT})(\Delta K_{EDU}) \quad (1)$$

In at least some implementations, the preliminary score may be normalized using a normalization factor ($\Delta K_N$). The use of such a normalization factor can scale the preliminary score ($\Delta K$) to a defined range, for example the range of 0 to 1.

One or more defined preliminary score threshold values may be used by the selection device 102 to prune or otherwise reject poor hypothetical pairings 130 from consideration by the machine learning system 160 during the training phase. By rejecting poor hypothetical pairings 130 during training, the accuracy and reliability of the run-time heuristic value provided by the machine learning system 160 may be improved. In at least some implementations, the one or more threshold values may be based on an algorithm such as the one described previously where the product of age, height, and education factors is determined. If such a preliminary score is greater than or equal to a first defined threshold value, the hypothetical pairing 130 may be considered a "good match" (i.e., a pairing having a relatively high likelihood of success compared to historically successful pairings) that is supplied as a training example 150b to the machine learning system 160. If, on the other hand, the preliminary score is less than the first defined threshold value, the hypothetical pairing 130 may be considered a "poor match" (i.e., a pairing having a relatively low likelihood of success compared to historically successful pairings) that is not supplied to the machine learning system 160 as a training example 150.

Figure 3:
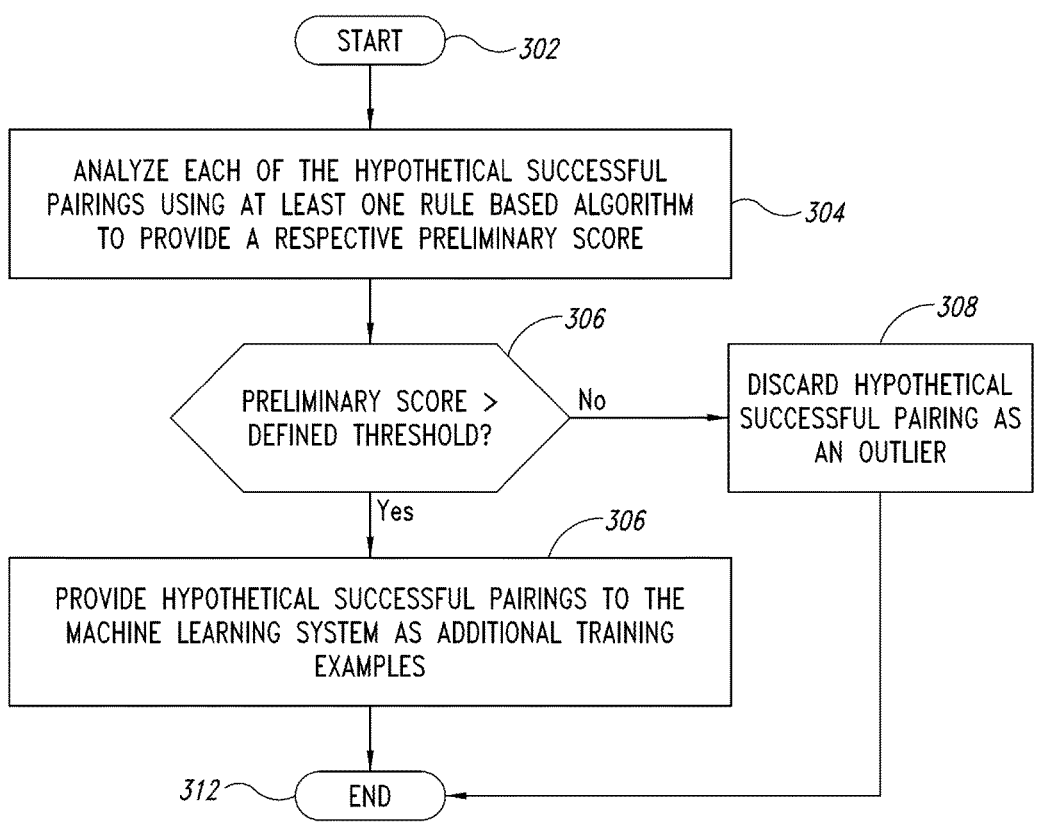
FIG. 3 is a high level flow diagram of an illustrative machine learning system training method that removes from the set of hypothetically successful pairings those hypothetical pairings that are deemed unlikely to succeed based on a preliminary score falling below a defined threshold, according to one non-limiting illustrated embodiment.

FIG. 3 shows a method 300 of implementing one such rule-based algorithm by the training example selection device 102, according to one illustrated embodiment. One or more rule-based algorithms may be used by the training example selection device 102 to prune or otherwise reject from the training examples 150 provided to the machine learning system 160 those hypothetical pairings 130 having a preliminary score that is indicative of a relatively low likelihood of success compared to historically successful pairings. The use of hypothetically successful pairings 130 advantageously increases the number of pairings available as training examples 150 when training the machine learning system 160 which may advantageously increase the run-time reliability, accuracy and consistency of the heuristic values provided by the machine learning system 160. However, inclusion of hypothetically successful pairings 130 that have proven historically unsuccessful may adversely impact the reliability, accuracy, or consistency of the heuristic value provided during run-time operation of the machine learning system 160. Eliminating the use of such marginal or questionable hypothetical pairings 130 as training examples 150 may therefore beneficially improve the run-time reliability, accuracy and consistency of the machine learning system 160. The method 300 commences at 302.

At 304, the training example selection device 102 analyzes each of the proposed hypothetically successful pairings 130 using at least one rule-based algorithm to determine a preliminary score that is logically associated with the proposed hypothetically successful pairing 130. In at least one implementation, such a rule-based algorithm may include the determination of one or more age, height, and education attribute factors based on various first entity attribute values 108, hypothetical second entity attribute values 134, or some combination of both first and hypothetical second entity attribute values. In at least some instances, one or more attribute factors may be identified as having a particular degree of importance that exceeds the importance of other attribute factors appearing in the algorithm. In such circumstances those attribute factors identified as being particularly important may be numerically adjusted, for example by squaring, cubing, or similar, to increase the influence of those attribute factors in determining the preliminary score generated using the algorithm. In other instances, one or more attribute factors may be identified as having a lesser degree of importance relative to the other attribute factors appearing in the algorithm. In such circumstances, those attribute factors identified as being of lesser importance may be numerically adjusted, for example by taking the square or cube root, or similar, to decrease the influence of those attribute factors in determining the preliminary score generated using the algorithm.

Using the respective attribute factors and the rule-based algorithm along with any optional attribute factor weighting, the training example selection device 102 determines the preliminary score for each of the hypothetically successful pairings 130.

At 306, the training example selection device 102 determines whether the preliminary score logically associated with each of the hypothetically successful pairings 130 determined at 304 exceeds a defined preliminary score threshold. In at least some implementations, the respective preliminary score logically associated with each a number of historically unsuccessful pairings 120 may be used as a basis for establishing the threshold value.

If at 306 it is determined that the preliminary score determined at 304 fails to exceed the defined threshold value, the hypothetically successful pairing 130 logically associated with the preliminary score is considered a "poor pairing" and is pruned or otherwise rejected as a training example 150 at 308. Such pruned, rejected or discarded training examples 150 are not presented to the machine learning system 160 by the training example selection device 102.

On the other hand, if at 306 the preliminary score determined at 304 is found greater than or equal to the defined threshold value, the hypothetically successful pairing 130 is considered a "good pairing" and is provided as a training example 150 to the machine learning system 160 by the training example selection device 102 at 310. In addition to increasing the number of available training examples 150 provided for training the machine learning system 160, the hypothetically successful pairings 130 provided during training also broaden the field of potential candidate second entities generated during run time operation of the machine learning system 160. For example, instead of viewing a difference in age attribute values as a liability that decreases the heuristic value logically associated with a prospective pairing, the machine learning system 160 may instead view the age difference in the context of the hypothetically successful pairing that was provided as a training example. Being able to view the difference in age attribute values as possibly leading to a successful pairing (i.e., the hypothetical pairing training example), the machine learning system 160 may logically associate a higher heuristic value with the prospective pairing despite the difference in age attribute values. The method 300 concludes at 312.

Upon completion of the machine learning system training phase, the formation, development, organization, and weighting of connections within the hueristic value generation layer 164 of the machine learning system 160 may reflect the attribute values logically associated with the first and second entities found in the historically successful pairings 104 and the hypothetically successful pairings 130 that were provided by the training example selection device 102 to the machine learning system 160.

Figure 4:
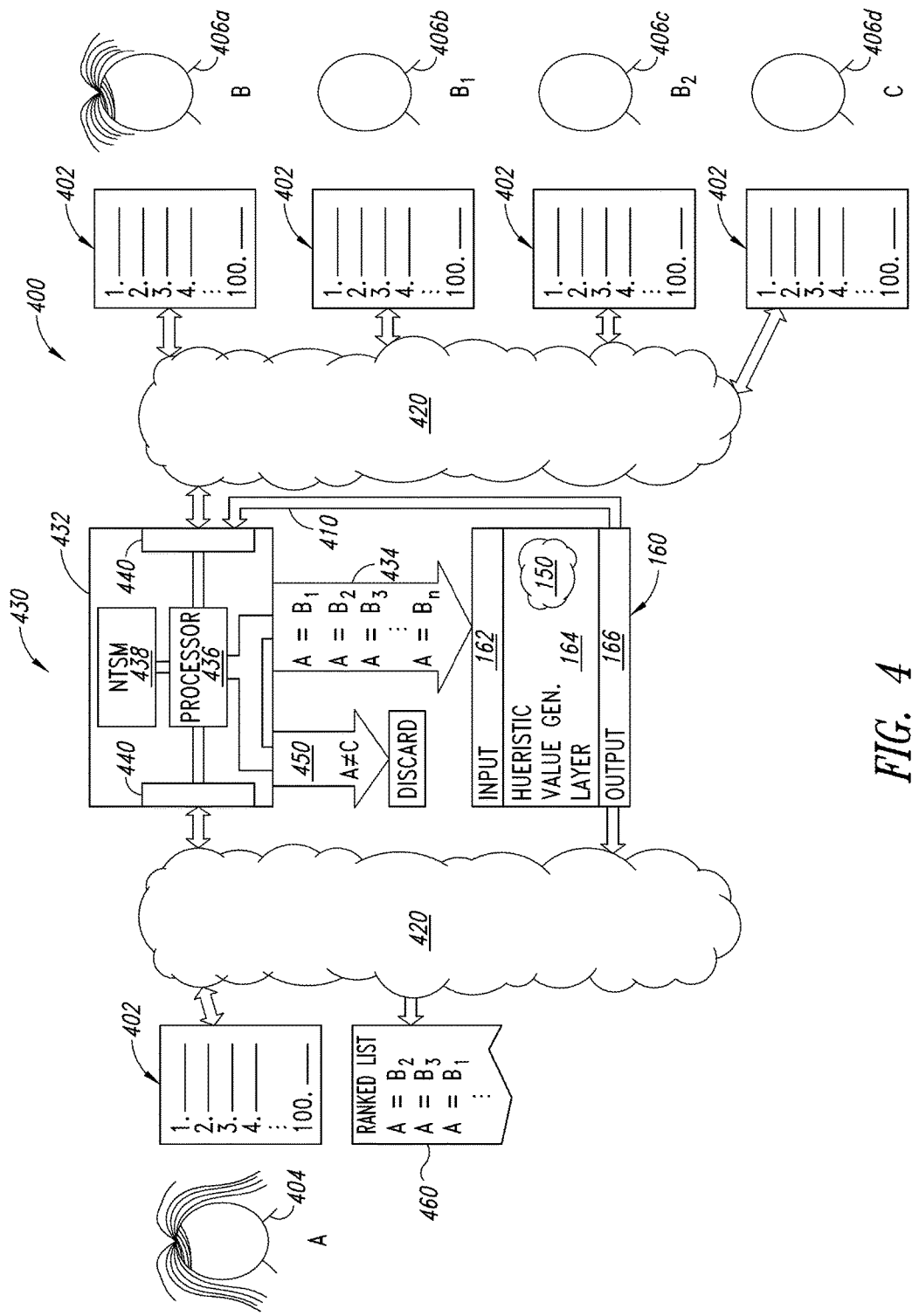
FIG. 4 is a schematic diagram illustrating an example trained machine learning system used to pair entities operating in a run-time environment, according to one non-limiting illustrated embodiment.

FIG. 4 shows a system 400 employing an example trained machine learning system 160 to pair or otherwise match a first entity 404 with one or more second entities 406a-406d (collectively, "second entities 406"), according to one or more illustrated embodiments.

Such systems 400 include online matching, dating, or similar relationship building services accessible via the Internet. Such matching or pairing Websites may collect any number of attribute values for each of the entities who subscribe, join, participate or otherwise take advantage of one or more offered services. These attribute values are then used to match or otherwise pair entities based upon one or more criterion, for example one or more perceived mutual interests. In the system 400 such a first entity 404 is prospectively matched to any number of second entities 406. Using attribute values logically associated with the first entity 404 and attribute values logically associated with each second entity 406, appropriate attribute factors are determined for each prospective pairing and rule based algorithms applied by a screening device 432 to determine whether the prospective pairings between the first entity 404 and each of the second entities 406 yield a pairing having a greater likelihood of success 434 or a lesser likelihood of success 450. Those prospective pairings found to have a lesser likelihood of success 450 are pruned or otherwise rejected. Those prospective pairings found to have a greater likelihood of success 434 are provided to the machine learning system 160 to determine a heuristic value at least indicative of the likelihood of success of the pairing. For each prospective pairing 434 provided to the machine learning system 160, a heuristic value 410 is generated and returned to the selection system 432. Various criteria may be employed in evaluating likelihood of success, for example a subset of criteria for instance geographical proximity and age proximity. It is also noted that evaluation of a successful pairing of a first entity with a second entity typically applies equally in reverse. That is the evaluation of how well a second entity will suit a first entity will typically be the same as the evaluation of how well the first entity will suit the second entity. Thus, the evaluation is not dependent on the perspective of for which entity of a pair of entities a candidate is being sought. Thus, the compatibility score generated via Equation 2 below, could typically be denominated as a mutual compatibility score.

In at least some instances, the selection system 432 may use one or more rule-based algorithms incorporating some or all of the attribute factors and a heuristic value provided by the machine learning system 160 to rank, sort, order, or otherwise filter at least a portion of the prospective pairings 434 between the first entity 404 and each of the second entities 406 into a sorted, ordered, ranked, or otherwise ordered list 460 having a defined order of presentation. Such ranked lists 460 may be sorted using one or more sort criteria supplied by the first entity 404 or the selection system 432. For example, the selection system 432 may default sort the ranked list by the projected or determined likelihood of forming a successful pairing (e.g., second entities having a greater likelihood appear at top of the ranked list, in a visually distinctive size, color, font, etc., or with a visually distinctive icon or symbol, while those having a lesser likelihood appear at the bottom of the ranked list, in a different size, color, font, etc., or with no or fewer visually distinctive icons or symbols).

In at least some implementations, the screening device 432 can use some or all of the attribute values logically associated with the first and the second entities in a prospective pairing 434 to determine a number of attribute factors that can be logically associated with the particular prospective pairing 434 formed by the first and the second entities. Such prospective pairing attribute factors may be used in the one or more rule-based algorithms to determine a preliminary score indicative of the likelihood of success of a particular prospective pairing 434 of a first entity 404 and a second entity 406. Such preliminary scores may be used by the screening device 432 to prune or otherwise remove from further consideration second entities 406 that have a lesser likelihood of forming a successful pairing with the first entity 404. During run-time operation of the machine learning system 160 data indicative of the attribute values logically associated with the first entity 404 and the second entity 406 in a particular prospective pairing 434 may be provided to the machine learning system 160. In response to the receipt of the attribute values logically associated with the entities in a particular prospective pairing 434, the machine learning system 160 determines a heuristic value indicative of the likelihood of success of the respective prospective pairing 434.

In at least some instances, the first and second entities 404, 406 may directly enter attribute values. For example, a "chemistry test" or similar questionnaire type interrogation device 402 generated, produced or otherwise provided by a Website owner or operator may explicitly ask the entity to provide an age, height, or weight. In other instances, the screening device 432 may indirectly infer attribute values from answers provided by the first and second entities 404, 406 responsive to questions on the questionnaire 402. For example, as a way of inferentially determining whether an entity prefers to be in the company of a more assertive individual the questionnaire 402 may include a number of questions that inquire whether the entity "likes to be with people who stand up for others" or "likes to participate with others in quiet activities." Such questionnaires 402 may be provided electronically, for example via a user interface provided by a Website or may be provided in hard copy format that is subsequently transcribed into an electronically readable format at a later point. Such questionnaires 402 may have tens or even hundreds of questions to parse or otherwise filter inaccurate or deceptive answers provided by an entity and to accurately capture both explicit and inferred attribute values that are indicative of the entity and therefore can be logically associated with the entity.

In at least some instances, the screening device 432 may determine at least a portion of the attribute values logically associated with an entity based upon the entity's interaction (e.g., choices, selections, browsing history, etc.) with at least one of: the matching, dating or relationship building Website or Web portal or all or a portion of the Internet.

Answers to the questionnaires 402 may be provided via one or more local, wide area, or worldwide networks 420 to an input interface 440 of the screening device 432. Such input interfaces 440 may include network interfaces such as a network interface card ("NIC") or may include some type of physical, optical, magnetic or similar media reader to collect data stored on one or more devices external to the screening device 432. Within the screening device 432, the input data received from the questionnaires 402 is communicated to at least one processor 436 where the attribute values are logically associated with the entity 404, 406 supplying the input values. In at least some implementations, a nontransitory storage 438 communicably coupled to the at least one processor 436 may be used to contain, retain, or otherwise store processor readable instructions used by the at least one processor to convert the answers provided by the entity into data indicative of a respective attribute value.

In at least some implementations, the nontransitory storage 438 may additionally include processor readable instructions used by the at least one processor 436 to determine any number of attribute factors logically associated with the prospective pairing of a first entity 404 and a second entity 406 using some or all of the attribute values logically associated with both of the entities. In at least some implementations, the nontransitory storage 438 may further include processor readable instructions used by the at least one processor 436 to determine the preliminary score based at least in part on at least one of: the attribute values logically associated with each entity in the prospective pairing; or the attribute factors logically associated with the prospective pairing. For example, upon receipt of input data from a new entity 404, 406 or updated input data from an existing entity 404, 406, the at least one processor 436 may attempt to match the new or updated entity to all other stored entities. When a large number of entities (e.g., in the thousands, hundreds of thousands, millions, or tens of millions) have provided attribute value data to the system 400, a large number of prospective pairings may be generated by the screening device 432. For each of these prospective pairings, the at least one processor 436 may determine a number of attribute factors logically associated with the prospective pairing and apply one or more rule-based algorithms (including any attribute weighting or the like) to determine whether a successful prospective pairing 434 or an unsuccessful prospective pairing 450 results. The initial screening of prospective pairings by the screening device 432 can, in some instances significantly, reduce the number of prospective pairings provided as an input to the machine learning system 160.

Data indicative of attribute values logically associated with the entities in prospective pairings found to provide a greater likelihood of forming a successful pairing 434 may be communicated by the screening device 432 to the input layer 162 of the machine learning system 160. Within the machine learning system hidden layer 164, a heuristic value is determined. The heuristic value is indicative of the projected degree of compatibility between the entities in each of the prospective pairings 434 provided to the machine learning system 160. The heuristic value logically associated with each prospective pairing 434 may be communicated from the output layer 166 of the machine learning system 160 to the screening device 432. In at least some implementations, data indicative of the heuristic value provided by the machine learning system 160 for each prospective pairing can have a value between 0 and 1. In some implementations the heuristic value determined by the machine learning system 160 may be quantized or similarly collected into a number of subranges each having a different assigned value or weight to provide a heuristic factor ($\Delta K_{HEU}$).

In at least some implementations, all or a portion of the selection device 102, all or a portion of the screening device 432 and all or a portion of the machine learning system 160 may be collocated or disposed in a common location. In at least some implementations, the selection device 102, the screening device 432 and the machine learning system 160 may be communicably coupled using a wired, wireless, or combined wired and wireless network. Such networks may include one or more local area networks, wide area networks, or worldwide networks such as the Internet. In at least some instances, the selection device 102 or the screening device 432 may be communicably coupled to one or more external user interfaces, for example one or more Web portals provided by an Internet Service Provider.

The system 400 can logically associate a compatibility score ($\Delta K_{CS}$) with each respective prospective pairing 434 by numerically or mathematically combining or manipulating the various attribute factors discussed above, the heuristic value, any normalization factors, and any weighting applied to some or all of the attribute factors or the heuristic value logically associated with a particular prospective pairing 434. For example, in one embodiment, a compatibility score may be determined by taking the multiplicative product of all factors as shown in Equation 2 below:

$$\Delta K_{CS} = (\Delta K_{AGE})(\Delta K_{HGT})(\Delta K_{EDU})(\Delta K_{HEu})(\Delta K_N) \quad (2)$$

Such a compatibility score will provide a numeric value between 0 and 1 that is at least partially indicative of the compatibility of the two entities or of the likelihood of success of a pairing between the two entities.

Optionally, the compatibility factor may be provided to at least one of the entities for use as a tool in determining whether they should pursue a pairing with the other entity. In at least some instances, for example where multiple second entities 406 are seeking a pairing with a single first entity 404 (as shown in FIG. 4), the determined compatibility factor logically associated each pairing may be used by the screening device 432 to present a list 460 of potential second entity candidates that are ranked or otherwise sorted based at least in part on the likelihood of forming a successful pairing with the first entity. Such an itemized or sorted list 460 may be presented or otherwise provided to the first entity 404.

Figure 5:
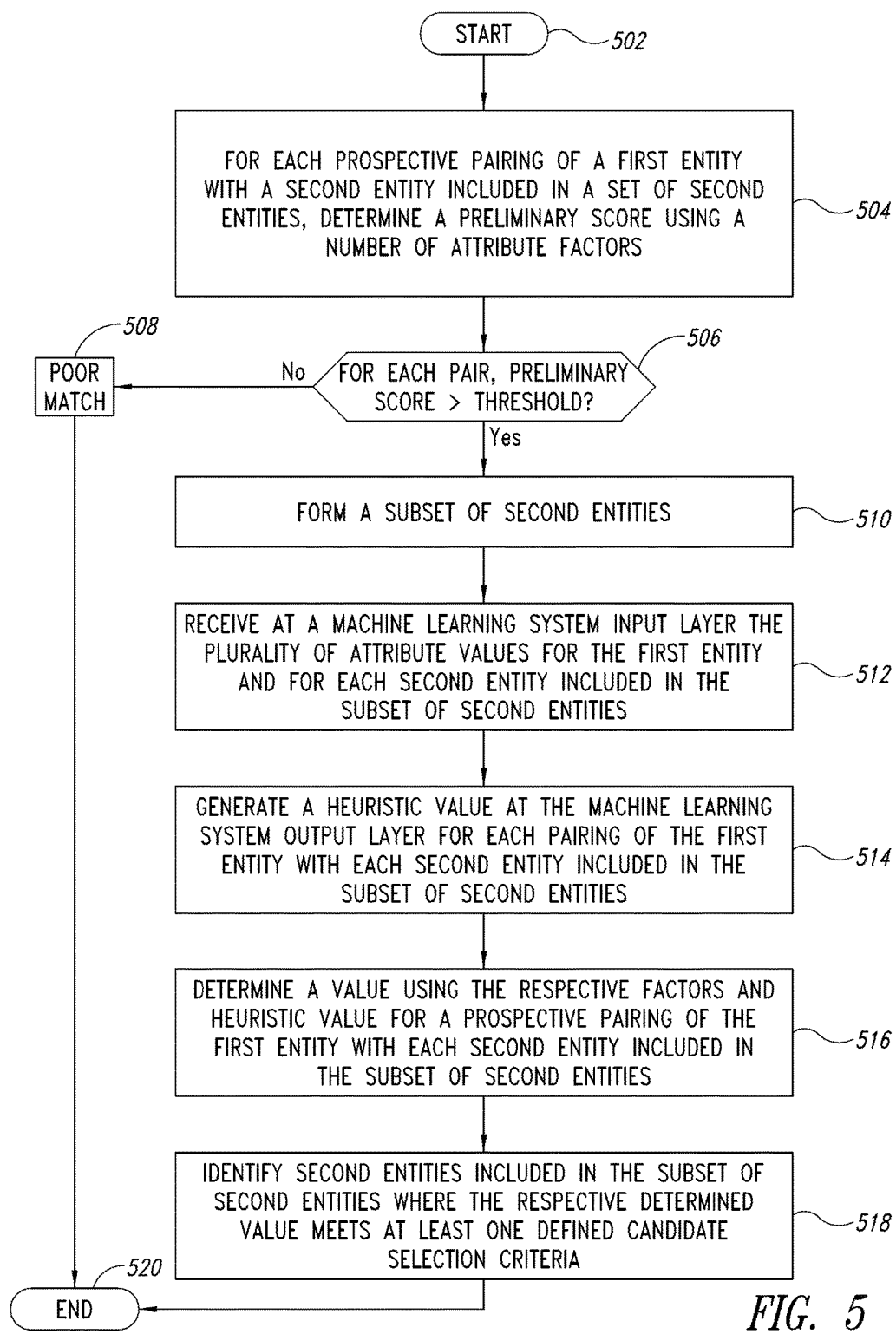
FIG. 5 is a high level flow diagram of an illustrative method that provides a subset of second entities having the greatest likelihood of forming a pairing to a first entity, the subset of second entities selected at least in part using a trained machine learning system, according to one non-limiting illustrated embodiment.

FIG. 5 shows a method 500 of using a screening device 432 or system 400 to rank or classify pairings based on a determined overall likelihood of forming a successful pairing, according to one illustrated embodiment. The machine learning system 160 beneficially provides a way to rank or otherwise classify those pairings where the preliminary score logically associated with the prospective pairing 434 indicates a greater likelihood of forming a successful pairing. The screening device 432 can evaluate each prospective pairing of a first entity 404 and a potential candidate second entity 406 to determine whether the preliminary score logically associated with the pairing indicates an increased likelihood of forming a successful pairing between the entities. For those prospective pairings 434 where a greater likelihood of forming a successful pairing exists, the "potential candidate" second entity 406 may be considered a "prospective candidate" second entity 406 and the attribute values logically associated with each entity in the prospective pairing 434 may be communicated to the machine learning system 160 to determine one or more heuristic values. The heuristic values may be useful in ranking, classifying, or quantifying the prospective pairing beyond the simple determination that the prospective pairing "has a greater likelihood of success" based on the preliminary score. The method 500 commences at 502.

At 504, the screening device 432 evaluates a number of prospective pairings between a first entity 404 and one of a number of potential candidate second entities 406 included in a set of second entities. The screening device 432 may determine any number of attribute factors that are logically associated with the prospective pairing. The attribute factors may be based at least partially on the attribute values logically associated with the first entity 404 and the potential candidate second entity 406 forming the prospective pairing. Some or all of the attribute factors may be used by the screening device 432 to evaluate the prospective pairing by determining at least one preliminary score ($\Delta K$) that is logically associated with the prospective pairing and indicative of the likelihood of forming a successful pairing between the entities. In at least some instances, the evaluation performed by the screening device 432 may include computationally, numerically, or mathematically combining the various determined factors using one or more rule-based algorithms.

At 506, the screening device 432 determines whether the preliminary score is greater than or exceeds one or more defined preliminary score threshold values. For preliminary scores falling below the one or more defined preliminary score threshold values, the prospective pairing logically associated with the preliminary score is deemed a "poor match." In response, the second entity 406 in the prospective pairing 450 is pruned, or otherwise rejected from further consideration for pairing with the first entity 404 by the system 400 at 508. For preliminary scores meeting or exceeding the one or more defined preliminary score threshold values, the second entity 406 in the logically associated prospective pairing 434 is deemed to provide a greater likelihood of forming a successful pairing with the first entity 404 (i.e., the "potential candidate" second entity becomes a "prospective candidate" second entity) and is presented as a prospective candidate second entity to the first entity 404.

At 510, those prospective candidate second entities 406 that have been found to provide a greater likelihood of forming a successful pairing with the first entity 404 (e.g., potential candidate second entities 406 in those prospective pairings 434 having a logically associated preliminary score meeting or exceeding the defined preliminary score threshold value) are collected to form a subset of second entities that include all or a portion of the prospective candidate second entities 406.

At 512, for each prospective pairing between the first entity 404 and a prospective candidate second entity 406 included in the subset of second entities, attribute values logically associated with the first entity 404 and the respective prospective candidate second entity 406 are provided to the input layer 162 of the run-time machine learning system 160.

At 514, the machine learning system 160 generates a heuristic value logically associated with each of the prospective parings 434 between the first entity 404 and the respective prospective candidate second entity 406 that was selected from the subset of second entities. The determined heuristic value provides additional data indicative of the compatibility of the first entity 404 and the respective prospective candidate second entity 406 forming the prospective pair. The machine learning system 160 generates output data indicative of the heuristic value or heuristic factor at the output layer 166.

At 516, the system 400 determines a compatibility score ($\Delta K_{CS}$) for each of the prospective pairings between the first entity 404 and each of the prospective candidate second entities 406 included in the subset of second entities. In at least some implementations, the compatibility score can be logically associated with the prospective pairing 434. The system 400 determines the compatibility score using the attribute factors logically associated with the prospective pairing, the heuristic value logically associated with the prospective pairing, and any optional normalization or weighting factors. In at least one implementation, a single compatibility score may be determined using a rule-based algorithm that mathematically or numerically combines the attribute factors logically associated with the prospective pairing, the heuristic value logically associated with the prospective pairing, and any optional normalization or weighting factors.

At 518, the system 400 may optionally rank, sort, or order the prospective candidate second entities 406 included in the subset of second entities using one or more ordering or sorting criterion. In at least some implementations, the system 400 may use the compatibility score determined at 516 to rank, sort, or order the prospective candidate second entities 406 included in the subset of second entities. In one such implementation, the prospective candidate second entities 406 may be presented in list form 460 in descending order based upon the likelihood of forming a successful pairing with the first entity 404 as determined using the heuristic value logically associated with the prospective pairing. In another such implementation, the prospective candidate second entities 406 may be presented in list form 460 in descending order based upon the likelihood of forming a successful pairing with the first entity 404 as determined using the compatibility score logically associated with the prospective pairing. In other implementations, the first entity 404 may specify or otherwise provide a preferred the ranking, sorting, or ordering criterion for presentation of the prospective candidate second entities 406. The method 500 concludes at 520.

Figure 6:
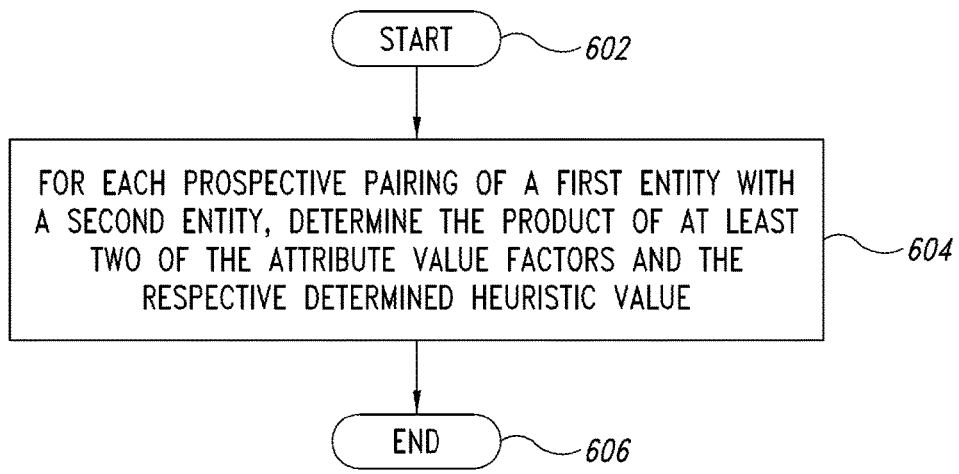
FIG. 6 is a high level flow diagram of an illustrative method using a rule-based algorithm to determine a compatibility score for each prospective pairing of a first entity with a second entity using a number of attribute factors and a machine learning system supplied heuristic value, according to one non-limiting illustrated embodiment.

FIG. 6 shows a method 600 of an illustrative rule-based algorithm useful in determining the compatibility score for each of the prospective pairs, according to one illustrated embodiment. As noted above, one or more rule-based algorithms are used at 516 to determine the compatibility score ($\Delta K_{CS}$) for each of the prospective pairings between the first entity 404 and each of the prospective candidate second entities 406 included in the subset of second entities. The method 600 commences at 602.

At 604, the system 400 determines a compatibility score for each prospective pairing 434 that is then logically associated with the prospective pairing 434. In at least some implementations, the system may determine the compatibility score for a prospective pairing 434 by finding the multiplicative product of at least two of the attribute factors logically associated with the prospective pairing 434 and the heuristic value logically associated with the prospective pairing 434. In at least some implementations, the screening device 432 can provide some or all of the attribute factors (e.g., ($\Delta K_{AGE}$), ($\Delta K_{HGT}$), and ($\Delta K_{EDU}$)) that are logically associated with each prospective pairing and the machine learning system 160 can provides the heuristic value that is logically associated with each prospective pairing. An example rule-based algorithm is provided in Equation 3 below:

$$\Delta K_{CS} = [\text{at least two of } (\Delta K_{AGE})(\Delta K_{HGT})(\Delta K_{EDU})] \\ [\text{heuristic factor}] \quad (3)$$

The method 600 concludes at 606.

Figure 7:
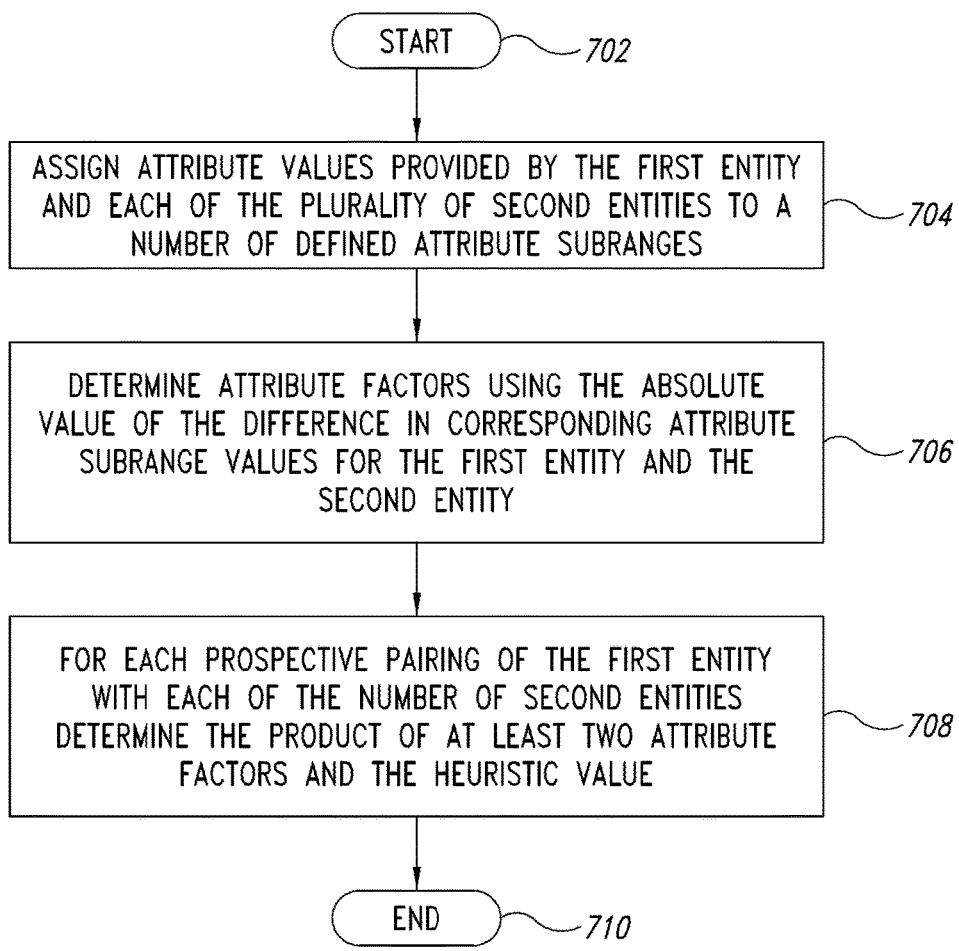
FIG. 7 is a high level flow diagram of another illustrative method to determine a compatibility score for each pairing of a first entity with a second entity using a rule-based algorithm incorporating attribute factors determined using attribute value subranges and a machine learning system supplied heuristic value, according to one non-limiting illustrated embodiment.

FIG. 7 shows another method 700 that provides another illustrative example of a rule-based algorithm useful to determine the compatibility score ($\Delta K_{CS}$) logically associated with each of the prospective pairs 434, according to one illustrated embodiment. The method 700 commences at 702.

At 704, the screening device 432 quantizes, unitizes, or otherwise groups, collects, and assigns to one of a number of attribute value subranges some or all of the attribute values logically associated with the first entity 404 and some or all of the attribute values logically associated with the second entity 406. For example, an educational attribute value indicative of a high school diploma may be assigned to a first subrange having an associated first attribute subrange value, an educational attribute value indicative of a bachelor's degree may be assigned to a second subrange having an associated second attribute subrange value and an educational attribute value indicative of a higher level degree may be assigned to a third subrange having a third attribute subrange value.

At 706, the screening device 432 determines the attribute factors logically associated with a prospective pairing of the first entity 404 with one of the second entities 406 selected from the set of second entities. In at least some implementations, the screening device 432 determines each of the attribute factors logically associated with a prospective pairing by taking the absolute value of the difference between corresponding attribute subrange values for each corresponding first entity 404 and second entity 406 attribute.

At 708, the system 400 determines at least one compatibility score ($\Delta K_{CS}$) logically associated with a prospective pairing 434. In at least some implementations, the at least one compatibility score may be determined by finding multiplicative product of the attribute factors logically associated with the prospective pairing 434 provided by the screening device 432 at 706, and the heuristic value logically associated with the prospective pairing 434 provided by the machine learning system 160. The compatibility scores logically associated with each of the prospective pairings 434 provide a value indicative of the likelihood of success of the respective prospective pairing of the first entity 404 with the second entity 406. The method 700 concludes at 710.

Figure 8:
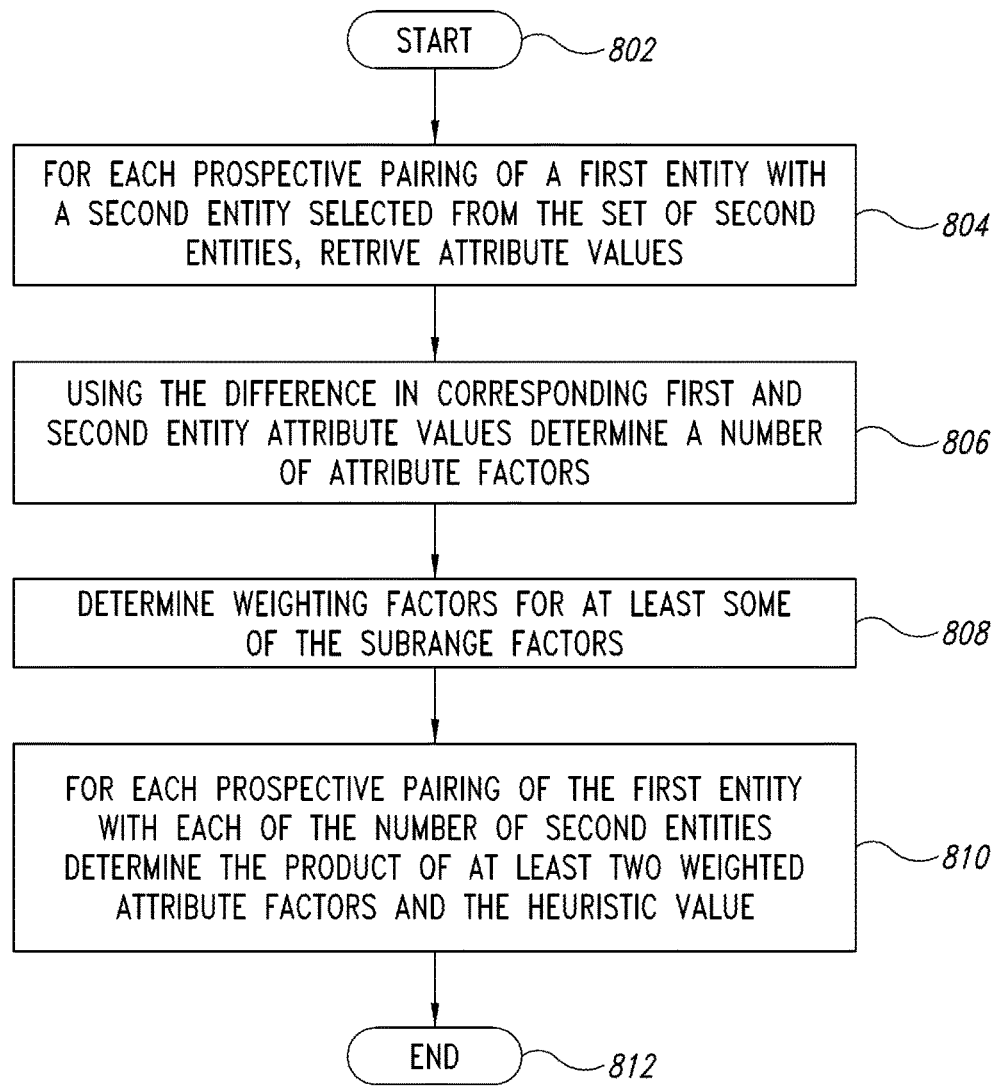
FIG. 8 is a high level flow diagram of another illustrative method to determine a compatibility score for each pairing of a first entity with a second entity using a rule-based algorithm incorporating weighted attribute factors determined using attribute value subranges and a machine learning system supplied heuristic value, according to one non-limiting illustrated embodiment.

FIG. 8 shows a method 800 that provides another illustrative rule-based algorithm including attribute factor weighting useful in determining the compatibility score logically associated with each of the prospective pairs, according to one illustrated embodiment. In at least some implementations, one or more attribute factors logically associated with a prospective pairing may be found to provide a stronger or more reliable indicator of the likelihood that a pairing will be successful. In such instances, when calculating the compatibility score ($\Delta K_{CS}$) logically associated with the prospective pairing it may be beneficial to weight attribute factors identified as having increased importance that are logically associated with a prospective pairing to reflect the relatively greater strength or influence one or more particular attribute value factors may have on determining the ultimate success of the pairing. The method 800 commences at 802.

At 804, the screening device 432 retrieves data indicative of the attribute values logically associated with the first entity 404 and the second entity 406 in each prospective pairing. In at least some instances, the data indicative of the attribute values logically associated with the first entity 404 and the second entity 406 may be retrieved from the non-transitory storage medium 438 or from a data store external to the screening device 432.

At 806, the screening device 432 determines a number of attribute factors using the difference in corresponding attribute values logically associated with the first entity 404 and the second entity 406 in each prospective pairing. The screening device 432 can logically associate the attribute factors with the particular prospective pairing. For example, one attribute factor may be based in whole or in part on the age difference between the first entity 404 and the second entity 406. Such an age difference may be determined using age attribute values logically associated with the first entity 404 and the second entity 406. Using such an example, if the age difference between the first entity 404 and a second entity 406 in a prospective pairing, the age attribute factor ($\Delta K_{AGE}$) logically associated with the prospective pairing may be assigned a value of "3" corresponding to an age subrange of +/−6 years to +/−9 years having a subrange value of "3".

At 808, the system 400 determines one or more weighting factors ($W_F$) applicable to some or all of the attribute factors determined at 804. In some instances, the weighting factor may be used to emphasize the associated attribute factor where the particular attribute factor has been found or determined to have particular importance or relevance in assessing the likelihood that a pairing will be successful. For example, in at least some instances one or more attribute factors may be emphasized by squaring or cubing the value of the attribute factor. In other instances, the weighting factor may be used to deemphasize the associated attribute factor where the particular attribute factor has been deemed of lesser importance or relevance for determining the likelihood that a pairing will be successful. For example, in one instance the influence of one or more attribute factors may be deemphasized by taking the square or cube root of the value of the attribute factor. In at least some implementations, the weighting factor may be defined in whole or in part based on the attribute values of the first entity 404, the attribute values of the second entity 406, or some combination thereof. In other implementations, the weighting factor may be defined in whole or in part based on attributes found in a number of historically successful pairings 104. The weighting factor can be a multiplier selected from any numeric range (e.g., 0-3; 5-5; 0-10; etc.).

At 810, the system 400 determines a compatibility score ($\Delta K_{CS}$) for logical association with each prospective pairing 434 by finding the multiplicative product of at least two of the weighted attribute factors logically associated with the prospective pairing and the heuristic value logically associated with the respective pairing. An illustrative compatibility score calculation is provided by Equation 4 below:

$$\Delta K_{CS} = [\text{at least two of } (W_{F1} \Delta K_{AGE})(W_{F2} \Delta K_{HGT}) (W_{F3} \Delta K_{EDU})][\text{heuristic}] \quad (4)$$

In at least some implementations, the attribute factors (e.g., ($\Delta K_{AGE}$), ($\Delta K_{HGT}$), and ($\Delta K_{EDU}$)) may be those determined by the screening device 432 and logically associated with the respective prospective pairing of a first entity 404 and a second entity 406. The method 800 concludes at 812.

Figure 9:
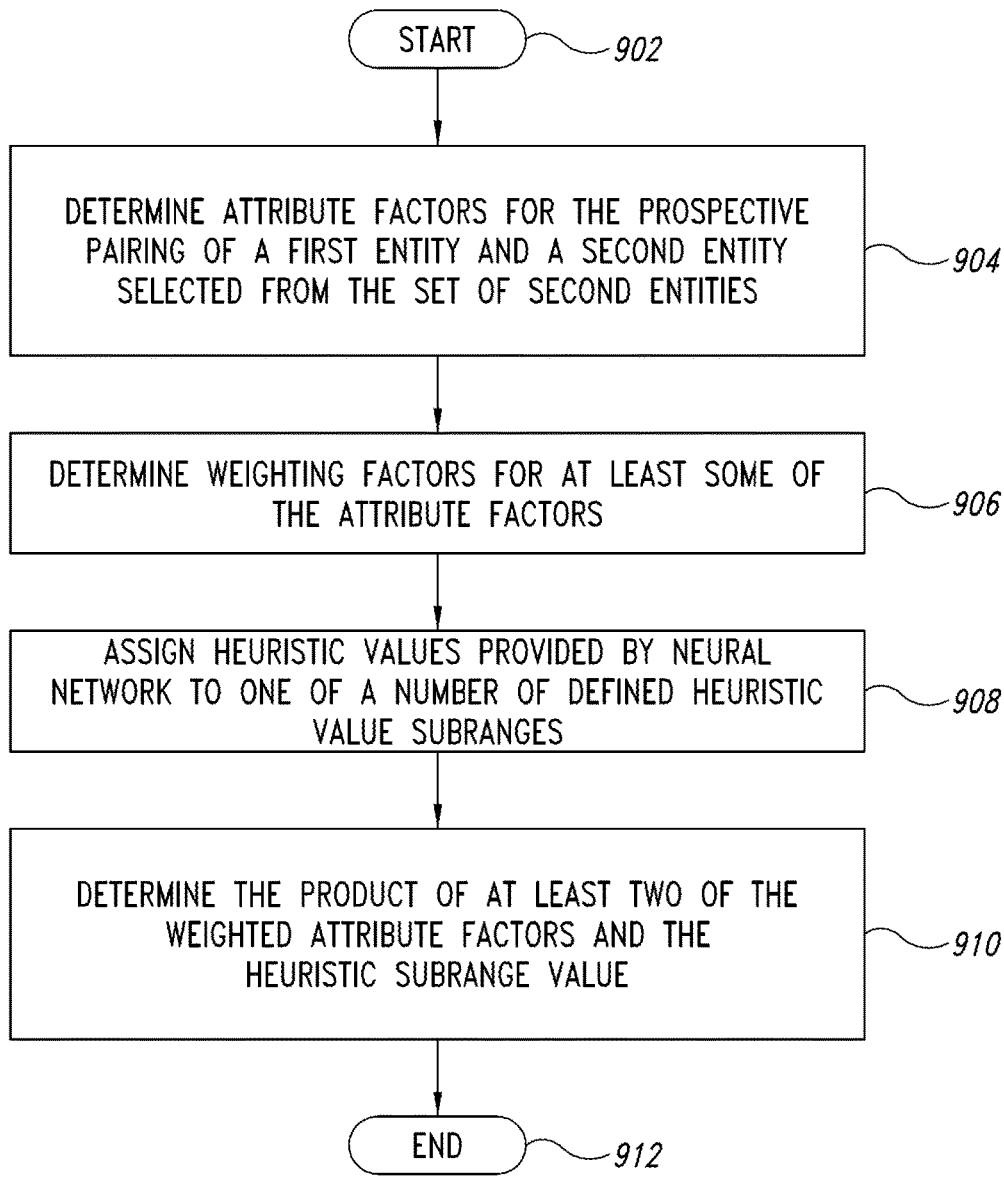
FIG. 9 is a high level flow diagram of another illustrative method to determine a compatibility score for each pairing of a first entity with a second entity using a rule-based algorithm incorporating weighted attribute factors determined using attribute value subranges and a machine learning system supplied heuristic value determined using a heuristic value subrange, according to one non-limiting illustrated embodiment.

FIG. 9 shows a method 900 that implements a rule-based algorithm including attribute factor weighting and heuristic value weighting that is useful in determining the compatibility score logically associated with each of the prospective pairs, according to one illustrated embodiment. In yet other implementations, in addition to weighting one or more attribute factors logically associated with a prospective pair 434, the system 400 may also weight the heuristic value logically associated with the prospective pair 434. Such heuristic value weighting may, for example, provide a way to emphasize a heuristic value having a relatively high degree of confidence or de-emphasize a heuristic value having a relatively low degree of confidence. The method commences at 902.

At 904, the screening device 432 determines attribute factors logically associated with each of the prospective pairings between a first entity 404 and each of the second entities 406 selected from a set of second entities. In at least some implementations, the attribute factors logically associated with a prospective pairing may be obtained by taking the absolute value of the difference between corresponding attribute subrange values for each corresponding first entity 404 and second entity 406 attribute, as described in detail above with regard to FIG. 7. In other implementations, the attribute factors logically associated with a prospective pairing may be obtained using the difference in corresponding attribute values logically associated with the first entity 404 and the second entity 406 in each prospective pairing, as described in detail above with regard to FIG. 8. Other methods based on the attribute values logically associated with the first entity, the attribute values logically associated with a second entity selected from the set of second entities, or combinations thereof may also be employed by the screening device 432 to determine some or all of the attribute factors logically associated with a prospective pairing at 904. Additionally, the screening device 432 can determine each of the attribute factors logically associated with a prospective pairing at 904 using the same or different methods.

At 906, the screening device 432 applies one or more weighting factors to some or all of the attribute factors logically associated with a prospective pairing determined at 904. In some instances, the weighting factor may be used to emphasize the associated attribute factor where the particular attribute factor has been found or determined to have particular importance or relevance in assessing the likelihood that a pairing will be successful. For example, in at least some instances one or more attribute factors may be emphasized by squaring or cubing the attribute factor. In other instances, the weighting factor may be used to deemphasize the associated attribute factor where the particular attribute factor has been deemed of lesser importance or relevance for determining the likelihood that a pairing will be successful. For example, in one instance the influence of one or more attribute factors on the compatibility score may be deemphasized by taking the square or cube root of the attribute factor. In at least some implementations, the weighting factor may be defined in whole or in part based on the attribute values of the first entity 404, the attribute values of the second entity 406, or some combination thereof. In other implementations, the weighting factor may be defined in whole or in part based on attributes found in a number of historically successful pairings 104. The weighting factor can be a multiplier selected from any numeric range (e.g., 0-3; 5-5; 0-10; etc.).

At 908, the system 400 determines a heuristic factor for logical association with the prospective pairing 434 by assigning the heuristic value determined by the machine learning system 160 to one of a number of defined heuristic value subranges. In at least some implementations, the heuristic value may be assigned to a defined subrange based in whole or in part on the numeric value of the heuristic value logically associated with the prospective pairing 434, one or more attribute factors logically associated with the prospective pairing 434, a preliminary score logically associated with the prospective pairing 434, or some combination thereof. In at least some implementations, each of the heuristic subranges may be assigned a corresponding numeric value. For example, in at least some implementations, the heuristic value provided by the machine learning system 160 may be quantized or grouped into one of four subranges as follows:

TABLE 2

HEURISTIC FACTORS

| Subrange | Criteria | Value ($\Delta K_{HEU}$) |
|---|---|---|
| A | heuristic value from 0.750 to 1.000 | 4 |
| B | heuristic value from 0.500 to 0.749 | 3 |
| C | heuristic value from 0.250 to 0.499 | 2 |
| D | heuristic value from 0.000 to 0.249 | 1 |

At 910, the system 400 determines the compatibility score ($\Delta K_{CS}$) logically associated with each prospective pairing 434 by finding the multiplicative product of at least two of the weighted attribute factors logically associated with each prospective pairing 434 and the heuristic factor logically associated with each prospective pairing 434. An illustrative determination of such a compatibility score is provided in Equation 5 below:

$$\Delta K_{CS} = [\text{at least two of } (W_{F1}\Delta K_{AGE})(W_{F2}\Delta K_{HGT})(W_{F3}\Delta K_{EDU})][K_{HEU}] \quad (5)$$

The method 900 concludes at 912.

Figure 10:
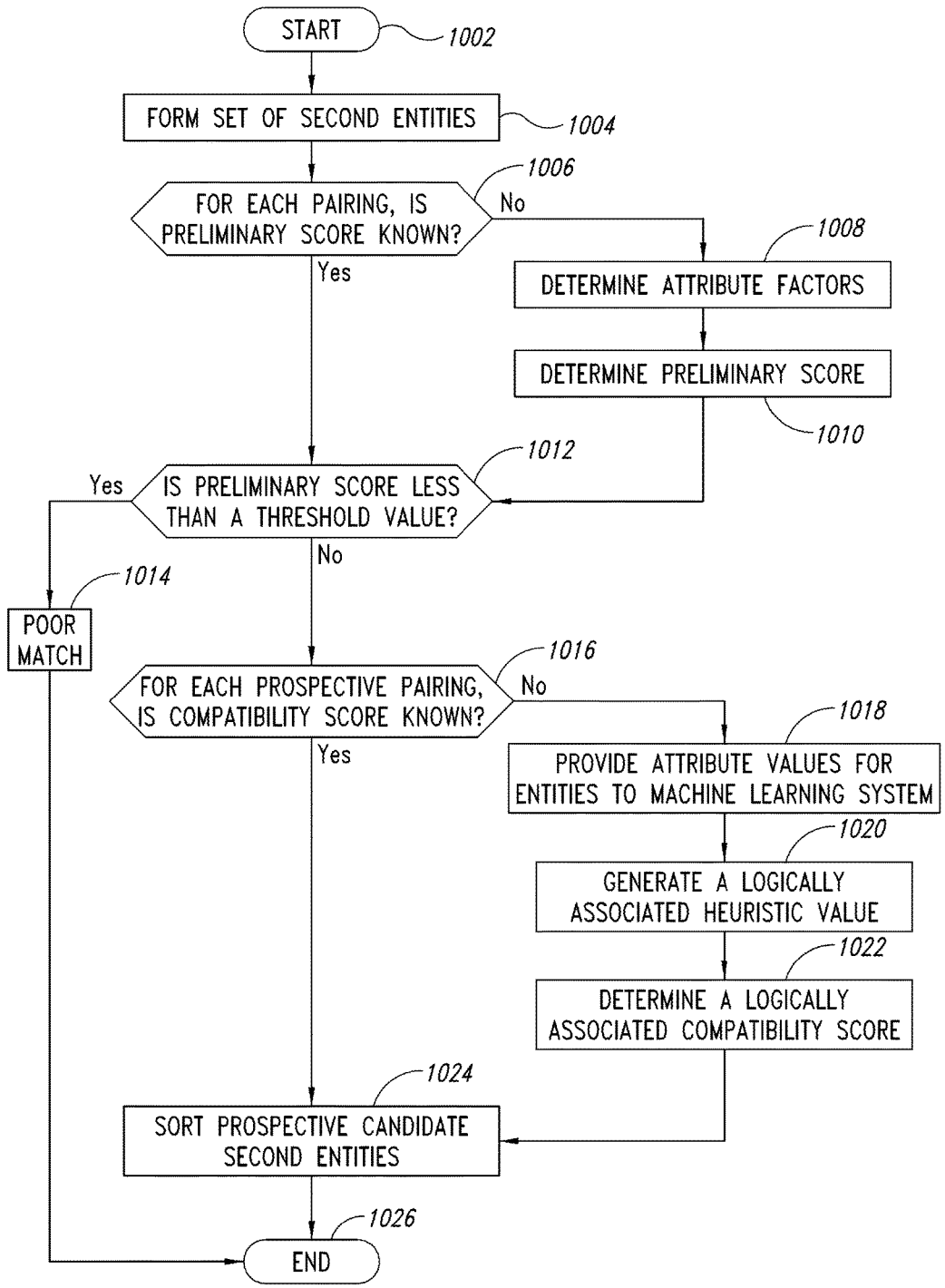
FIG. 10 is a high level flow diagram of an illustrative method that presents potential pairings between a number of second entities and a first entity sorted by a compatibility score determined using at least one rule-based algorithm, according to one non-limiting illustrated embodiment.

FIG. 10 shows a method 1000 that presents a number of prospective candidate second entities 406 to a first entity 404 in a rank, order, or sequence that is defined by either the system 400 or the first entity 404, according to one illustrated embodiment. In at least some situations, a set of potential candidate second entities may include a large number of potential candidate second entities 406 for presentation to a first entity 404. In such instances, high quality prospective candidate second entities 406 that provide the greatest likelihood of forming a successful pairing with the first entity 404 may get "lost" in the much larger number of lower quality prospective candidate second entities 406. Manually sorting through a set of second entities containing a large number of prospective candidate second entities 406 is a time and labor consuming proposition for the first entity 404. In addition, due to the sheer volume of prospective candidate second entities 406, the first entity 404 may mistakenly overlook an ideal prospective candidate second entity 406. In such instances, it may be advantageous for the system 400 to present the prospective candidate second entities 406 to the first entity 404 using a defined ranking, sorting or ordering (e.g., sorted by the compatibility score logically associated with the pairing of the first entity 404 and each respective second entity 406). The method 1000 commences at 1002.

At 1004, a set including any number of potential candidate second entities 406 is formed. In at least some implementations, the set of second entity candidates 406 may be populated with potential candidate second entities 406 selected by the system 400. Such system selected potential candidate second entities 406 may already meet one or more defined criteria (e.g., prospective second entities 406 that form a prospective pairing having a logically associated preliminary score exceeding one or more defined preliminary score thresholds) with the first entity 104. In other implementations, all or a portion of the set of potential candidate second entities 406 may be formed without first determining the preliminary score logically associated with the pairing of the first entity 404 with the respective potential candidate second entity 406. Such may occur, for example when a second entity 406 requests a pairing with the first entity 404 (e.g., responsive to a posting by a first entity 404 to an Internet dating Website to which second entities 406 seeking a relationship respond). Thus, some or all of the second entities 406 in the set of second entities may have an associated preliminary score that is logically associated with a prospective pairing with the first entity 404, an associated compatibility score that is logically associated with a prospective pairing with the first entity 404, or neither an associated preliminary score nor an associated compatibility score that is logically associated with a pairing with the first entity 404.

At 1006, the system 400 determines whether preliminary scores logically associated with pairings between the first entity 404 and each of the second entities 406 in the set of second entities exist. For those pairings found by the system 400 not to have a logically associated preliminary score at 1006, the system 400 determines a preliminary score that is logically associated with the pairing of the first entity 404 and the respective second entity 406.

At 1008, the screening device 432 determines one or more attribute factors logically associated with the pairing of the first entity 404 and the respective potential candidate second entity. In at least some implementations, the one or more attribute factors may be determined by the at least one processor 436 using one or more rule-based algorithms. Such rule based algorithms may be stored as machine executable code in the nontransitory storage medium 438 communicably coupled to the at least one processor.

At 1010, the screening device 432 determines a preliminary score logically associated with the pairing of the first entity 404 and the respective potential candidate second entity. In at least some implementations, the preliminary score may be determined by the at least one processor 436 using one or more rule-based algorithms. Such rule based algorithms may be stored as machine executable code in the nontransitory storage medium 438 communicably coupled to the at least one processor.

One such illustrative rule-based algorithm useful for determining the preliminary score logically associated with a prospective pairing between a first entity 404 and a respective potential candidate second entity 406 includes determining the multiplicative product of an age attribute factor ($\Delta K_{AGE}$) logically associated with the pairing, an educational attribute factor ($\Delta K_{EDU}$) logically associated with the pairing, and a height attribute factor ($\Delta K_{HGT}$) logically associated with the pairing. The algorithm for determining the preliminary score is provided in Equation 6 below:

$$\Delta K = (\Delta K_{AGE})(\Delta K_{HGT})(\Delta K_{EDU}) \quad (6)$$

At 1012, the preliminary scores logically associated with each of the pairings between the first entity 404 and each respective potential candidate second entity 406 are compared to one or more preliminary score threshold values. Those pairings logically associated with preliminary scores falling below the one or more preliminary score threshold values may be pruned or otherwise discarded at 1014 as a "poor" pairing having a relatively low likelihood of forming a successful pairing. Those pairings logically associated with preliminary scores greater than or equal to the one or more preliminary score threshold values are considered prospective pairings between the first entity 404 and a prospective candidate second entity 406.

At 1016, the system 400 determines whether compatibility scores logically associated with pairings between the first entity 404 and each of the second entities 406 in the set of second entities exist. For those pairings found by the system 400 not to have a logically associated compatibility score at 1016, the system determines a compatibility score that can be logically associated with the pairing of the first entity 404 and the respective second entity 406.

At 1018, for those pairings found by the system 400 not to have a logically associated compatibility score at 1016 the screening device 432 can provide attribute values logically associated with the first entity 404 and the prospective candidate second entity 406 to the input layer 162 of the machine learning system 160.

At 1020, for those pairings found by the system 400 not to have a logically associated compatibility score at 1016 the machine learning system 160 generates at an output layer 166 a heuristic value logically associated with the prospective pairing of the first entity 404 with the prospective candidate second entity 406. The heuristic value logically associated with each respective prospective pairing provides an indication of the relative compatibility of the first entity 404 with the prospective candidate second entity 404. In at least some implementations, the heuristic value provided by the machine learning system 160 may be provided as a value between zero ("0") and one ("1") that is indicative of the overall projected level of compatibility between the first entity 404 and the candidate second entity 406. In some instances, the heuristic value provided by the machine learning system 160 may be quantized into one of a number of subranges each having a particular associated subrange value to provide a heuristic factor rather than a heuristic value.

In at least some instances the heuristic value logically associated with each of the prospective pairings 434 may be communicated 410 to the screening device 432 for determination of the compatibility factor logically associated with the prospective pairing.

At 1022, the system 400 can determine a compatibility score that can be logically associated with each respective prospective pairing. In at least some implementations, the screening device 432 may determine the compatibility score logically associated with each respective prospective pairing. In some implementations, the compatibility score logically associated with each respective prospective pairing may be calculated or otherwise determined by the system 400 using one or more rule-based algorithms and all or a portion of the respective attribute factors logically associated with each prospective pairing and the heuristic value that is logically associated with the prospective pairing. In other implementations, the compatibility score may be calculated or otherwise determined by the system 400 using one or more rule-based algorithms and all or a portion of the respective attribute factors logically associated with each prospective pairing, the heuristic value logically associated with each prospective pairing, and one or more weighting factors. In yet other implementations, the compatibility score may be calculated or otherwise determined by the system 400 using one or more rule-based algorithms and all or a portion of the respective attribute factors logically associated with each prospective pairing and the heuristic factor logically associated with the prospective pairing. In yet other implementations, the compatibility score may be calculated or otherwise determined by the system 400 using one or more rule-based algorithms and all or a portion of the respective attribute factors logically associated with each prospective pairing, the heuristic factor logically associated with the prospective pairing, and one or more weighting factors.

At 1024, the prospective candidate second entities 406 may be presented to the first entity 404 in a defined order based at least in part on the compatibility score logically associated with each prospective pairing between the first entity 404 and the second entity 406. In some implementations, prospective candidate second entities 406 providing a greater likelihood of forming a successful relationship with the first entity 404 may be visually distinguishable from those prospective candidate second entities 406 providing a lesser likelihood of forming a successful relationship. Where a large number of potential candidate second entities 406 are presented to a first entity 404, such a presentation can provide the first entity 404 with list in which the prospective candidate second entities 406 providing the greatest likelihood of forming a successful pairing are readily distinguishable over other prospective candidate second entities 406. The method concludes at 1026.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 61/691,082, filed Aug. 20, 2012 and U.S. Patent Publication No. 2010/0262611, published Oct. 14, 2010, are incorporated herein by reference, in their entirety. Aspects of the embodiments can be modified, if necessary, to employ systems, circuits and concepts of the various patents, applications and publications to provide yet further embodiments.

Also for example, the various methods may include additional acts, omit some acts, and may perform the acts in a different order than set out in the various flow diagrams. The use of ordinals such as first, second and third, do not necessarily imply a ranked sense of order, but rather may only distinguish between multiple instances of an act or structure.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A training system to train at least a first machine learning system of a candidate selection system, the training system comprising:
at least one non-transitory processor-readable medium that stores processor-executable instructions; and
at least one processor communicably coupled to the at least one non-transitory processor-readable medium and which executes the processor-executable instructions and in response:
identifies from a plurality of entities a first entity and a second entity that are a historically successful pairing based at least in part on an absence of both the first and the second entities from candidate selection system for a defined period of time, each of the plurality of entities associated with a plurality of attributes;
generates a plurality of hypothetical entities, each of the hypothetical entities based on the second entity in the historically successful pairing, and each of the hypothetical entities having a plurality of attributes which are based on a corresponding plurality of attributes for the second entity upon which the hypothetical entity is based, at least one attribute of the plurality of attributes of the hypothetical entity modified to be different from the corresponding attribute of the first entity in the successful pairing;

generates a plurality of hypothetical alternative pairings, each of the plurality of hypothetical alternative pairings comprising:
an alternative pairing between the first entity and one of the plurality of hypothetical entities based on the second entity;
provides the first machine learning system of the candidate selection system with the historically successful pairing as one training example; and
provides the first machine learning system of the candidate selection system with at least one of the hypothetical alternative pairings as an additional training example.

2. The training system of claim 1 wherein at least one attribute of the plurality of attributes has a respective range of values including at least three sequentially ordered possible values.

3. The training system of claim 2 wherein for at least one of the attributes, the at least one processor determines in which one of at least two discrete sub-ranges the value of the attribute resides, assigns a respective sub-range value, and employs the respective sub-range value to generate the plurality of hypothetical entities based at least in part on respective values of the plurality of attributes.

4. The training system of claim 1 wherein the at least one processor further:
for at least one of the entities,
receives a plurality of inputs; and
deduces the respective value for at least one of the attributes based at least in part on the received plurality of inputs.

5. The training system of claim 1 wherein the at least one processor further:
prunes the alternative pairing as an outlier instance before providing the first machine learning system of the candidate selection system with the alternative pairing as an additional training example.

6. A method of training at least a first machine learning system of a candidate selection system, the method comprising:
identifying by at least one processor a first entity and a second entity, out of a plurality of entities, that are a historically successful pairing;
generating by the at least one processor a plurality of hypothetical entities, each of the hypothetical entities based on the second entity in the historically successful pairing, and each of the hypothetical entities having a plurality of attributes which are based on a corresponding plurality of attributes for the second entity upon which the hypothetical entity is based, at least one attribute of the plurality of attributes of the hypothetical entity modified to be different from the corresponding attribute of the second entity in the historically successful pairing;
generating by the at least one processor a plurality of hypothetical alternative pairings, each of the plurality of hypothetical alternative pairings comprising:
an alternative pairing between the first entity and one of the plurality of hypothetical entities based on the second entity;
providing the first machine learning system of the candidate selection system with the historically successful match as one training example; and
providing the first machine learning system of the candidate selection system with at least one of the hypothetical alternative pairings as an additional training example.

7. The method of claim 6 wherein at least a first one of the attributes has a respective first range of values including at least three possible values.

8. The method of claim 6, wherein at least a first one of the attributes has a respective range of values including at least three sequentially ordered possible values.

9. The method of claim 8, further comprising:
for at least one of the attributes, identifying a respective sub-range value for the value of the attribute, and employing the sub-range value in generating the plurality of hypothetical entities based at least in part on respective values of the plurality of attributes.

10. The method of claim 6, further comprising:
for at least one of the first entity and the second entity, receiving an input that specifies the value for at least one of the attributes of the respective entity.

11. The method of claim 6, further comprising:
for at least one of the first entity and the second entity, receiving a plurality of inputs; and
deducing the value for at least one of the attributes based at least in part on the received plurality of inputs.

12. The method of claim 6, further comprising:
pruning at the hypothetical alternative pairing as an outlier instance before providing the first machine learning system of the candidate selection system with the alternative pairing as an additional training example.

13. The method of claim 6, wherein identifying the historically successful pairing is based at least in part on an absence of both the first and the second entities from candidate selection system for a defined period of time.

14. A candidate selection system for finding matches between entities, comprising:
at least one machine learning system which includes:
at least one non-transitory processor-readable medium that stores processor-executable instructions; and
at least one processor communicably coupled to the at least one non-transitory processor-readable medium and which executes the processor-executable instructions to:
implement the at least one machine learning system including an input layer, an output layer and a hidden layer, the at least one machine learning system trained with at least a first entity and a second entity that are a historically successful pairing, and trained with a plurality of hypothetical alternative pairings between the first entity of the historically successful pairing and other entities of a first set of entities, the hypothetical alternative pairings based on at least one value of at least one attribute of a plurality of attributes associated with the second entity and at least one loosened constraint of a number of constraints on matching the at least one value of the at least one attribute associated with the second entity; and
at least one processor-based system, the at least one processor-based system communicatively coupled to the machine learning system, the at least one processor-based system includes:
at least one non-transitory processor-readable medium that stores processor-executable instructions; and
at least one processor communicably coupled to the at least one non-transitory processor-readable medium and which executes the processor-executable instructions to:

receive a number of heuristic values indicative of a strength of a pairing between the first entity and at least one of the entities of the first set of entities; and execute a candidate selection algorithm which employs the received heuristic values and respective values for each of the plurality of attributes to identify prospective candidates within a second set of entities.

15. The candidate selection system of claim 14 wherein the at least one processor-based system determines a product of a plurality of respective scores for each of at least two of the attributes of the plurality of attributes.

16. The candidate selection system of claim 15 wherein at least a first one of the attributes has a respective first range of values including at least three sequentially ordered possible values, and for at least the first one of the attributes, the at least one processor determines in which one of at least two discrete sub-ranges the value of the attribute resides, each of the sub-ranges logically associated with a respective score.

17. The candidate selection system of claim 16 wherein at least one processor-based system weights the scores for at least some of the attributes relative to other of the attributes.

18. The candidate selection system of claim 16 wherein the received heuristic values are normalized values.

19. The candidate selection system of claim 16 wherein the attributes include at least one of: an entity's specified intent, an entity's specified age, an entity's specified height, an entity's specified income, an entity's specified educational attainment level, or an entity's specified body type, represented by a respective data object logically associated with a respective one of the entities.

20. The candidate selection system of claim 14 wherein the hypothetical alternative pairings result from an exact match between respective values for less than all of the attributes for the respective entities.

21. The candidate selection system of claim 14 wherein at least some of the prospective candidates are presented to a user in a ranked order.

22. The candidate selection system of claim 14 wherein a plurality of messages sent to the first entity by other ones of the entities are presented to the first entity in a ranked order, the ranked order reflecting a strength of a pairing between the first entity and the other ones of the entities.

23. The candidate selection system of claim 14, further comprising:

at least a first processor-based server system, communicatively coupled to receive information about the first entity and the second entity, to receive requests for prospective candidates, to provide prospective candidate information to at least some of the entities, and to present a plurality of messages sent to the first entity by other ones of the entities in a ranked order, the ranked order reflecting a strength of a pairing between at least the first entity and the other ones of the entities.

24. The candidate selection system of claim 14, further comprising:

at least a first processor-based server system, communicatively coupled to receive information about the first entity and the second entity, to receive requests for potential candidates, and to provide prospective candidate identifying information to at least one of the first entity and the second entity.

25. The candidate selection system of claim 14 wherein the second set of entities is different from the first set of entities.

26. A method of using a candidate selection system that includes at least a first trained machine learning system, the method comprising:

receiving, by at least one processor-based system, a number of heuristic values each indicative of a strength of a respective pairing between two entities, the heuristic values generated by at least one machine learning system trained with at least a first entity and a second entity that are a historically successful pairing, and trained with a plurality of hypothetical alternative pairings between the first entity of the historically successful pairing and other entities of a first set of entities based at least in part on at least one value of each of at least one of a plurality of attributes associated with the second entity and based on at least one loosened constraint of a number of constraints applied to matches between the values of at least one of the attributes associated with the second entity; and executing, by the at least one processor-based system, a candidate selection algorithm which employs the received heuristic values and respective values for each of the plurality of attributes for each of a second set of entities to identify prospective candidates.

27. The method of claim 26 wherein executing a candidate selection algorithm includes determining a product of a plurality of respective scores for each of at least two of the attributes and the heuristic values.

28. The method of claim 27 wherein at least a first one of the attributes has a respective first range of values including at least three sequentially ordered possible values, and further comprising:

for at least the first one of the attributes, determining in which one of at least two discrete sub-ranges the value of the attribute resides, by the at least one processor-based system, each of the sub-ranges logically associated with a respective score.

29. The method of claim 28 wherein executing a candidate selection algorithm includes weighting the scores for at least some of the attributes relative to other of the attributes, by the at least one processor-based system.

30. The method of claim 29, further comprising:

retrieving respective values of at least one of the plurality of attributes from a data object, including at least one of: an entity's specified intent, an entity's specified age, an entity's specified height, an entity's specified income, an entity's specified educational attainment level, or an entity's specified body type.

31. The method of claim 26 wherein receiving the heuristic values includes receiving normalized heuristic values.

32. The method of claim 26 wherein the hypothetical alternative pairings are indicative of an exact match between respective values of the first entity of the historically successful pairing and the entities of the first set of entities for less than all of the attributes of the plurality of attributes.

33. The method of claim 26, further comprising:

presenting at least some of the prospective candidates to a user in a ranked order.

34. The method of claim 26, further comprising:

presenting to the first entity at least some of a plurality of messages sent to the first entity by other ones of the entities in a ranked order, the ranked order reflecting a strength of a pairing between the first entity and the other ones of the entities.

35. The method of claim 26, further comprising:

receiving by at least a first processor-based server system information about the plurality of attributes for each of the entities of the second set of entities; and presenting to the first entity a plurality of messages sent to the first entity by other ones of the entities in a ranked order, the ranked order reflecting a strength of a pairing between at least the first entity and the other ones of the entities.

36. The method of claim 35 wherein presenting to the first entity the plurality of messages sent to the first entity by other ones of the entities in the ranked order includes setting an importance flag of a message.

37. The method of claim 26 wherein the second set of entities is different from the first set of entities.

* * * * *